US010861088B1

(12) United States Patent
Gau et al.

(10) Patent No.: US 10,861,088 B1
(45) Date of Patent: *Dec. 8, 2020

(54) MULTI-FUNCTIONAL INTEGRATED COMMUNICATIONS SYSTEM APPLICATION FOR USER TRANSACTIONS

(71) Applicant: AMERICAN INNOVATIVE APPLICATIONS CORPORATION, Clarksville, VA (US)

(72) Inventors: Shane Gau, Clarksville, VA (US); James H. Moody, Clarksville, VA (US)

(73) Assignee: American Innovative Applications Corporation, Clarksville, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,327

(22) Filed: Jan. 17, 2020

Related U.S. Application Data

(63) Continuation of application No. 15/706,949, filed on Sep. 18, 2017, now Pat. No. 10,540,711.

(60) Provisional application No. 62/395,689, filed on Sep. 16, 2016, provisional application No. 62/395,725, filed on Sep. 16, 2016.

(51) Int. Cl.
| | |
|---|---|
| *G06F 16/30* | (2019.01) |
| *G06Q 30/08* | (2012.01) |
| *G06Q 30/06* | (2012.01) |
| *G06Q 10/02* | (2012.01) |
| *H04L 12/58* | (2006.01) |

(52) U.S. Cl.
CPC ............ *G06Q 30/08* (2013.01); *G06Q 10/02* (2013.01); *G06Q 30/0601* (2013.01); *H04L 51/32* (2013.01)

(58) Field of Classification Search
CPC ..................................................... G06Q 10/02
See application file for complete search history.

(56) References Cited

U.S. PATENT DOCUMENTS

| | | | |
|---|---|---|---|
| 8,041,605 B1 * | 10/2011 | Harrity | G06Q 30/00 705/15 |
| 9,204,251 B1 | 12/2015 | Mendelson | |
| 9,426,627 B1 | 8/2016 | Logan et al. | |

(Continued)

OTHER PUBLICATIONS

Article entitled "How to skip the line at popular Charlotte restaurants with the new app Nowait", by Moore, dated Jul. 21, 2016, 7 pages.

(Continued)

*Primary Examiner* — Mahesh H Dwivedi
(74) *Attorney, Agent, or Firm* — Foley & Lardner LLP

(57) ABSTRACT

Disclosed herein is a limited intangible goods transaction system (LIGTS) that provides options to users to buy, sell, bid, and swap limited intangible goods and/or services, such as a position in a queue in a facility, a reservation for the facility, a ticket to an event, and the like, with other users interested in the same goods and/or services using a variety of computer-specific interfaces. LIGTS may employ an application server configured to receive a request from a first user to either sell, bid, or swap their position in the queue for the facility and notifying other users in the queue or interested to join the queue that the first user is interested to sell and/or swap his/her position within the queue. The application server may also update the queue dataset based on any changes in the positions of the users in the queue.

20 Claims, 15 Drawing Sheets

(56) References Cited

U.S. PATENT DOCUMENTS

| | | | |
|---|---|---|---|
| 10,026,099 B1 | 7/2018 | Joshi et al. | |
| 2002/0156749 A1* | 10/2002 | Sardy | G06Q 30/02 |
| | | | 705/80 |
| 2005/0043996 A1* | 2/2005 | Silver | G06Q 20/20 |
| | | | 705/15 |
| 2005/0256782 A1 | 11/2005 | Sands et al. | |
| 2009/0012704 A1 | 1/2009 | Franco et al. | |
| 2009/0325606 A1 | 12/2009 | Farris | |
| 2010/0015993 A1 | 1/2010 | Dingler et al. | |
| 2011/0307547 A1 | 12/2011 | Backer et al. | |
| 2012/0158934 A1 | 6/2012 | Xiao et al. | |
| 2013/0053004 A1 | 2/2013 | Siebert et al. | |
| 2013/0281084 A1 | 10/2013 | Batada et al. | |
| 2014/0045586 A1 | 2/2014 | Allen et al. | |
| 2014/0066029 A1 | 3/2014 | Brennan et al. | |
| 2014/0122136 A1 | 5/2014 | Jayanthi | |
| 2015/0039689 A1 | 2/2015 | Pridmore | |
| 2015/0242770 A1 | 8/2015 | Song et al. | |
| 2015/0254704 A1 | 9/2015 | Kothe et al. | |
| 2015/0317702 A1 | 11/2015 | Liang et al. | |
| 2015/0379993 A1 | 12/2015 | Subhojit et al. | |
| 2016/0078571 A1 | 3/2016 | Singh | |
| 2016/0292665 A1 | 10/2016 | Blanchard | |
| 2017/0011311 A1* | 1/2017 | Backer | H04L 67/18 |
| 2017/0026318 A1 | 1/2017 | Daniel et al. | |
| 2017/0161670 A1 | 6/2017 | Ng et al. | |
| 2017/0366621 A1 | 12/2017 | Sagar et al. | |
| 2018/0053194 A1 | 2/2018 | Bond et al. | |
| 2018/0096440 A1 | 4/2018 | Lopez et al. | |
| 2018/0122022 A1 | 5/2018 | Kelly et al. | |
| 2018/0218085 A1 | 8/2018 | Price et al. | |

OTHER PUBLICATIONS

Web-Archive Page of nowaitapp.com, by nowait, dated Dec. 5, 2015, 3 pages.
Article entitled Dining Conceirge App Launches Out of Beta, Arrives on Android:, by Perez, dated Feb. 4, 2015, 9 pages.

* cited by examiner

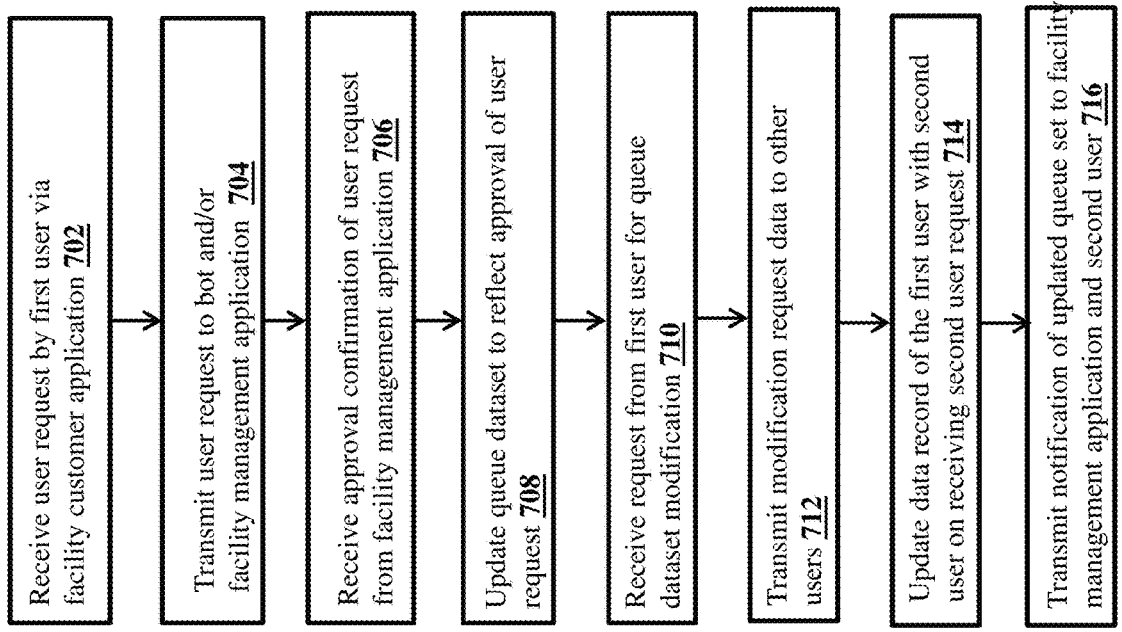

814

| | | | | | | |
|---|---|---|---|---|---|---|
| Home | Wait Line (2)<br>10 to 20 Minutes | ON OFF | | | | |
| Widget Builder | | | | | | |
| Guest Manager | Skip The Line (0) | ON OFF | | | | |
| Bot Builder | | | | | | |
| Dashboard | Reservation (0) | DATE<br>01/01/0001 | | | | |
| SMS Marketing Tool | | | | | | |
| | Seated (2) | | | | | |
| | Walk In/Table 03<br>9:18AM | | Party Size (2) | | Seated 2 at | |
| | Jim Moody<br>9:22AM | | Party Size (1) | | Seated at ☐ | 838 |

FIG. 8H

MULTI-FUNCTIONAL INTEGRATED COMMUNICATIONS SYSTEM APPLICATION FOR USER TRANSACTIONS

CROSS-REFERENCE TO RELATED APPLICATIONS

This application is a Continuation of U.S. patent application Ser. No. 15/706,949, filed Sep. 18, 2017, which claims priority to U.S. Provisional Patent Application Ser. No. 62/395,689, filed on Sep. 16, 2016, and U.S. Provisional Patent Application Ser. No. 62/395,725, filed on Sep. 16, 2016, which are hereby incorporated by reference in their entirety.

TECHNICAL FIELD

The present invention generally relates to communication systems and more specifically to a multi-functional integrated communications system application for enhancing communication between customers and a facility management through use of automated agents.

BACKGROUND

Queue management systems exist in the form of sequence number ticket systems, in which a user is required to take an order number and then stand in the proximity of the queue, where the information about a current order number is displayed. Should the user not be present when their turn arrives, the user loses the order and has to start over again. Conventional virtual queue management systems rely on the users' phone number to contact the users and update them regarding their position in the queue (e.g., by sending short text messages to the users). In addition, these conventional systems still require the users to be in a physically proximate distance from the queue. These traditional physical and virtual queue management systems generally work as first-in-first-out or first-in-last-out. Re-ordering a traditional queue (e.g., "cutting the line" or changing positions within the queue) involves social friction. Software solutions enabling interaction between queue participants and the interested facility have not yet been widely contemplated because it is technically challenging to create a unified software solution to be in synchronous contact with different parties (e.g., different people in the queue, potential other customers trying to buy or sell their positions within the queue, and the facility, which may desire to monitor the queue), continuously monitor the queue, and update the parties in real time. Creating a unified software solution to address the above-mentioned problems is also technically challenging because requiring all the parties to use the same application may create a negative user experience. For example, some users may not desire to log into a unified system to create a reservation or change their position within the queue.

SUMMARY

For the aforementioned reasons, there is a need for an accurate, efficient, and user-friendly computer-implemented system and method to collect user data, generate a virtual queue dataset, allow interactions between the users, potential customers, and the facility, continuously monitor and re-evaluate the queue dataset, and disseminate queue information to all the parties. The current disclosure describes a system and method that allows for re-ordering of user position in a queue, eliminating the need for traditional first-in-first-out or first-in-last-out ordering without resulting in social friction between customers in the line. Additionally, front-end and back-end of the current disclosure expand current available options for customers by allowing them not just to communicate and perform transactions with facilities but also with other users requiring the same goods and services.

In an embodiment, a method comprises receiving, by a server, via a facility customer application executing on a computing device of a first user from a plurality of users during a first session on a channel within a communication platform, a user request from the first user, wherein the facility customer application is configured to receive user requests from the user computing device and transmit the user request to at least one of a bot of the server and a facility management application, wherein the user request comprises at least a first user attribute and an order value associated with the user request, and wherein the communication platform is configured to: receive, from the facility customer application, the user requests and route the user request to the bot of the server via a bot connector, and receive, from a facility computing system, a message corresponding to the user request, the facility computing system comprising a user interface of the facility management application on a facility of a plurality of facilities computing device, wherein the user interface is configured to receive data associated with the facility; and transmitting, by the server, the user request to the facility computing system of the facility; upon transmitting the user request, receiving, by the server, an approval from the facility computing system of the facility; transmitting, by the server, to the computing device of the first user, during a second session on the channel within the communication platform, the message corresponding to the user request comprising a notification that the user request has been approved; updating, by the server, a plurality of data records within a data store configured to store data records containing information about a plurality of facilities, the plurality of users, and a queue dataset associated with each facility comprising at least one user, wherein the queue dataset is a data record representing a queue of the plurality of users at a facility of the plurality of facilities, wherein the queue dataset comprises an identifier for each user within the queue dataset corresponding an order value of the user, wherein the queue dataset is sorted, by the server, in accordance with the order value of each user; wherein the server updates and re-sorts the queue dataset upon receiving the approval from the facility computing system; receiving, by the server, from the first user, during a third session on the channel within the communication platform, a request for a queue dataset modification, wherein the request comprises a request to modify the data record associated with the first user within the queue dataset; upon receiving the request for modification, transmitting, by the server, to the plurality of users, on the channel within the communication platform, a facility identifier, the order value corresponding to the queue dataset associated with the first user, and a first sorting value corresponding to a ranking of the first user in the queue of plurality of users having the first user attribute; upon receiving a second user request from a second user, via the bot of the facility customer application executing on a computing device of the second user and during a fourth session on the channel within the communication platform, updating, by the server, the data record of the queue dataset associated with the first user by modifying the data record associated with the first user to be associated with the second user; transmitting, by the server, the updated queue dataset, to the facility computing system, whereby the server causes the user interface associated with the facility management application executing on at least one facility computing device to display a notification comprising identification of the second user and the modified queue dataset; and transmitting, by the server, via the bot of the facility customer application executing on the computing device of the second user and during the fourth session on the channel within the communication platform, a notification to the second user, wherein the notification contains the modified queue dataset.

In another embodiment, a computer system comprises a server that is configured to: receive via a facility customer application executing on a computing device of a first user from a plurality of users during a first session on a channel within a communication platform, a user request from the first user, wherein the facility customer application is configured to receive user requests from the user computing device and transmit the user request to at least one of a bot of the server and a facility management application, wherein the user request comprises at least a first user attribute and an order value associated with the user request, and wherein the communication platform is configured to: receive, from the facility customer application, the user requests and route the user request to the bot of the server via a bot connector, and receive, from a facility computing system, a message corresponding to the user request, the facility computing system comprising a user interface of the facility management application on a facility of a plurality of facilities computing device, wherein the user interface is configured to receive data associated with the facility; and transmit the user request to the facility computing system of the facility; upon transmitting the user request, receive an approval from the facility computing system of the facility; transmit to the computing device of the first user, during a second session on the channel within the communication platform, the message corresponding to the user request comprising a notification that the user request has been approved; update a plurality of data records within a data store configured to store data records containing information about a plurality of facilities, the plurality of users, and a queue dataset associated with each facility comprising at least one user, wherein the queue dataset is a data record representing a queue of the plurality of users at a facility of the plurality of facilities, wherein the queue dataset comprises an identifier for each user within the queue dataset corresponding an order value of the user, wherein the queue dataset is sorted, by the server, in accordance with the order value of each user; wherein the server updates and re-sorts the queue dataset upon receiving the approval from the facility computing system; receive from the first user, during a third session on the channel within the communication platform, a request for a queue dataset modification, wherein the request comprises a request to modify the data record associated with the first user within the queue dataset; upon receiving the request for modification, transmit to the plurality of users, on the channel within the communication platform, a facility identifier, the order value corresponding to the queue dataset associated with the first user, and a first sorting value corresponding to a ranking of the first user in the queue of plurality of users having the first user attribute; upon receiving a second user request from a second user, via the bot of the facility customer application executing on a computing device of the second user and during a fourth session on the channel within the communication platform, update the data record of the queue dataset associated with the first user by modifying the data record associated with the first user to be associated with the second user; transmit the updated queue dataset, to the facility computing system, whereby the server causes the user interface associated with the facility management application executing on at least one facility computing device to display a notification comprising identification of the second user and the modified queue dataset; and transmit via the bot of the facility customer application executing on the computing device of the second user and during the fourth session on the channel within the communication platform, a notification to the second user, wherein the notification contains the modified queue dataset.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates execution of a method for updating positions of one or more users of a plurality of users in a queue dataset (e.g., restaurant line) according to an exemplary embodiment.

FIG. 8H illustrates a graphical user interface showing a webpage of a facility computing system of a facility (FMA), according to an exemplary embodiment.

DETAILED DESCRIPTION

Figure 1:
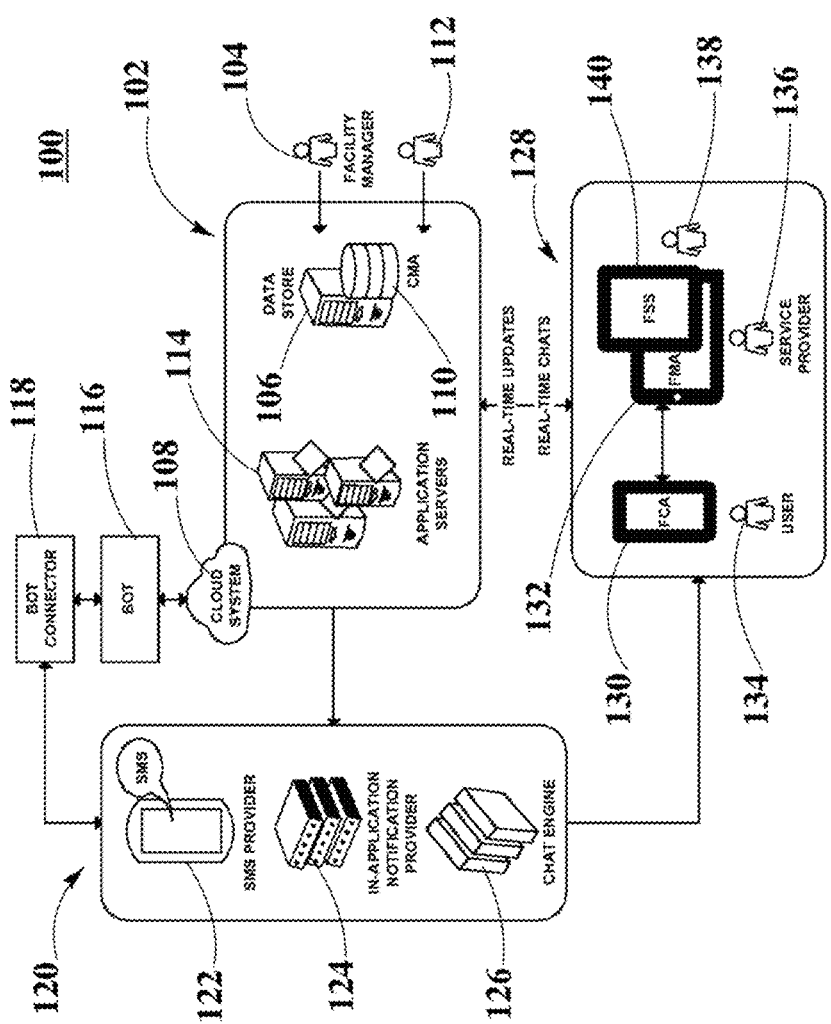
FIG. 1 illustrates an architectural diagram of a limited intangible goods transaction system (LIGTS), according to an exemplary embodiment.

In the following description, numerous specific details are set forth. However, it is understood that embodiments of the invention may be practiced without these specific details. In other instances, well-known circuits, structures, and techniques have not been shown in detail in order not to obscure the understanding of this description.

In the following description, reference is made to the accompanying drawings, which illustrate several embodiments of the present invention. It is understood that other embodiments may be utilized, and mechanical compositional, structural, electrical, and operational changes may be made without departing from the spirit and scope of the present disclosure. The following detailed description is not to be taken in a limiting sense, and the scope of the embodiments of the present invention is defined only by the claims of the issued patent.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

FIG. 1 illustrates an architectural diagram of UBRA 100, according to an embodiment. An information storage system 102 may be a host entity that is configured to communicatively couple a plurality of facilities, a plurality of users, and a communication platform. The information storage system 102 is configured to allow a facility manager 104 to maintain facility information in a data store 106. In one example, the data store 106 may be configured as at least one solid state drive that stores the most frequently used data and a hard disk drive that stores less frequently used data. The data store 106 may store information about each facility in a plurality of data records, whereby inputs from the facility manager 104 will update the data records accordingly. The information storage system 102 may also store information in a cloud system 108, which may include or be separate from the data store 106. Information in the data store 106 includes user information and contains PII of those users, but also associates the users with an identifier such that information about the users can be distributed to other components of the LIGTS 100 without sharing the PII.

The data store 106 is connected to a content management application (CMA) 110. The CMA 110 is a user interface configured to allow editing, adding, and deleting content from the data records in the data store 106. An LIGTS manager 112 may access the CMA 110 to edit information in the data store 106. Additionally, the CMA 110 may be configured to allow information from the data records of the data store 106 to be transmitted to application servers 114.

The application servers 114 are depicted as a plurality of servers but may be configured as a single server. The application servers 114 store and execute a bot 116 that is communicatively coupled to a bot connector 118 executing on a communication platform 120. Bot diagram 200 further describes a system architecture for the bot 116 and the bot connector 118.

The communication platform 120 is communicatively coupled to the information storage system 102. The communication platform 120 may execute an application configured to allow a text-based or voice-based communication via a computing device to another user, e.g., a chat application, a text message application native to an operating system, or a text message application hosted by a social networking platform. For example, the communication platform 120 may include an SMS provider 122, an in-application notification provider 124, and/or a chat engine 126.

Communication platform 120 and the information storage system 102 are communicatively coupled to a facility system 128 for each facility. The facility system 128 may include a facility customer application (FCA) 130 for each user and a facility management application (FMA) 132 for each of the plurality of facilities. The application servers 114 host the application executed by the FCA 130 and FMA 132.

The FCA 130 is an application that has a user interface configured for a computing device of a user 134 to input requests for the facility (e.g., reservation, food order). Most requests from FCA 130 will be communicated via communication platform 120. The application server 114 receives information from the communication platform 120 and transmits appropriate information to the FMA 132. In some instances, the FCA 130 may communicate directly with the FMA 132. For example, the user 134 may interact with FCA 130 to conduct a real-time chat with a service provider 136 or facility manager 138 of FMA 132.

FMA 132 is an application for the service provider 136 to maintain operational information about the facility (e.g., reservations, users in line, incentives, user information). The FMA 132 may be connected to a facility server screen (FSS) 140. FSS 140 is an application configured to provide information to a user interface for the facility manager 138 regarding a particular aspect of the facility (e.g., food quantities in a restaurant). The FSS 140 communicates with the FMA 132 to update each user interface accordingly.

According to an embodiment, real time updates are available between facility system 128 and information storage system 102, allowing user 134, service provider 136, and the facility manager 138 to mutually access updated information available from information storage system 102.

The FMA 132 receives information about the user's requests from the information storage system 102. However, the information does not include any PII of the user 134. In some instances, a first name or other identifier (e.g., username) may be used, but the FMA 132 does not receive contact information or a full name of the user 134. If the service provider 136 desires to contact the user 134, a message is transmitted to the information storage system 102 via the FMA 132 for delivery on the communication platform 120.

In operation, the application server 114 may receive, via the FCA 130 executed on a computing device of the user 134 during a session on a channel on a communication platform 120, a user request from the user 134. For example, the user 134 may utilize social media in order to initiate a chat session with the application server 114 via the FCA 130. The user may initiate the session (by initiating a chat session on a third-party website and selecting the application server 114 as a recipient of the chat session) and the application server 114 may display the FCA 130 on the chat session on the third-party website. The FCA 130 may be configured to receive user requests from the user 134 (and other users not shown) via the user 134 computing device and transmit the user requests to at least one of the bot 116 of the application server 114 or the FMA 132. The user requests may include PII associated with the users (e.g., age, sex, credit card number, and the like). The FCA 130 may transmit the user request to the application server 114 via the bot 116 or the bot connector 118. In some embodiments, the FCA 130 may also filter the sensitive PII and may not transmit the PII to the FMA 132. The application server 114 may display the FCA 130 on a communication platform 120 displayed on a computing device associated with the user 134 (e.g., the application server 114 may display the FCA 130 on the chat session used by the user 134). The FCA 130 may then use the communication platform 120 to transmit the user request to various computing devices described above. The communication platform 120 may be configured to receive, from the FCA 130, the user requests; the communication platform 120 may also be configured to route the user request to the bot 116 of the application server 114 via the bot connector 118. The communication platform 120 may also be configured to receive, from the facility system 128, a message corresponding to the user request. The facility system 128 may also comprise a user interface associated with the FMA 132, which is configured to be displayed on a facility computing device, wherein the user interface is configured to receive data associated with the facility. The application server 114 may allow the user 134 to communicate (via the FCA 130, bot 116, and/or bot connector 118) to various computing devices within the facility system 128. The application server 114 may also update a plurality of data records within the data store 106 configured to store the plurality of data records containing information about a plurality of facilities (including the facility system 128) and data records containing information about a plurality of users (including user 134 and other user not shown here), wherein the information about the plurality of users comprises personally identifiable information, wherein the server updates the plurality of data records based on the user request and the message corresponding to the user request.

In a non-limiting example, the user 134 may initiate a chat session with the application server 114 on a third party website (e.g., social media website) in order to reserve a table at a restaurant. Upon receiving an indication that a chat session has been initiated, the application server 114 may cause the FCA 130 to be displayed within the chat session on the social media website. The user 134 may type the user request and request to reserve a table at a particular restaurant. The user 134 may also indicate the number of patrons, a reservation time, and may include PII (e.g., credit card number in order to confirm the reservation). The FCA 130 may receive the data inputted by the user 134 and may utilize the communication platform 120 to transmit the user request to the bot connector 118, which is configured to transmit the user request to the bot 116 (e.g., the bot connector 118 is configured to route messages between the bot 116 of the application server 114 and the computing device of the user 134 via the channel of the communication platform 120 (e.g., different channels such as channels 122-126)).

The application server 114 may also (via the bot 116) transmit the user request to FMA 132. The FMA 132 is configured to receive and transmit information about the user 134 and the user request, from the FCA 130 via the bot 116 during the session, without any personally identifiable information of that user, update information about the facility in the data store 106, and receive and transmit information about the user 134 and the user request from the FCA 130 without communicating via the bot 116 during the session. For example, FMA 132 may receive the user request (e.g., table reservation for the user 134) and may display the user request on various computing devices associated with the facility system 128. An operator (associated with any of the computing devices of the facility system 128) may receive the user request on a user interface (e.g., FSS 140 and/or FMA 132) and may respond to the user request with a message corresponding to the user request (e.g., confirming the reservations based on the time and the number of patrons). The corresponding message then is received by the application server 114 (via FMA 132) and may transmit the message (via bot 116 and bot connector 118) to the FCA 130 (e.g., to be displayed to the user). The application server 114 may then update the data records within the data store 106 to reflect the reservation of the user 134. In some embodiments, the application server may facilitate a direct chat session between the user 134 and an operator at the facility system 128. For example, if the user 134 needs special accommodations, the user 134 may input the special accommodations into the chat session and the FCA 130 may transmit that special request directly to FMA 132 or FSS 140.

LIGTS 100 may also allow the facility manager 104 to input and access facility-related data into a data store 106, which is connected to a content management application (CMA 110). Data within the CMA 110 may be readily available for sharing with a LIGTS manager 112. Additionally, information from CMA 110 may also be shared with application servers 114. In addition, data from the information storage system 102 may be shared with the communication platform 120 (and all the other components described above). The communication platform 120 also shares information with a facility system 128, which may include a facility customer application (FCA 130) connected to a facility management application (FMA 132). In general, a facility manager 104 makes a limited intangible good available through FMA 132 included in LIGTS 100, and one or more users 134 are then able to sell, buy, bid, and exchange these goods amongst each other through LIGTS 100 user experience (UX) (e.g., different parties described within FIG. 1 and their interactions with numerous user interfaces provided by the LIGTS 100.

In an embodiment, a user 134 may use the bot 116 to communicate with the application server 114 in order to reserve a place in a queue associated with the facility system 128 (e.g., reserve a spot in a line of a restaurant). The user 134 may use the bot to input information and request to be added to a queue. The request may also include attributes of the user (personal identification, or other information) and attributes associated with the request (e.g., special dining request, such as dining preferences). The bot may then parse the data received (e.g., using various methods such as natural language processing) and transfer the data to the application server 114. The application server 114 may then update a queue dataset within a database (such as data store 106) to reflect the user within a virtual queue of the facility. The application server 114 may then receive a request to modify the queue dataset and add, replace, and/or, modify the data record associated with the user 134 with another user (e.g., a buyer of the user 134's spot within the queue). The application server 114 may then modify the queue dataset.

Figure 2:
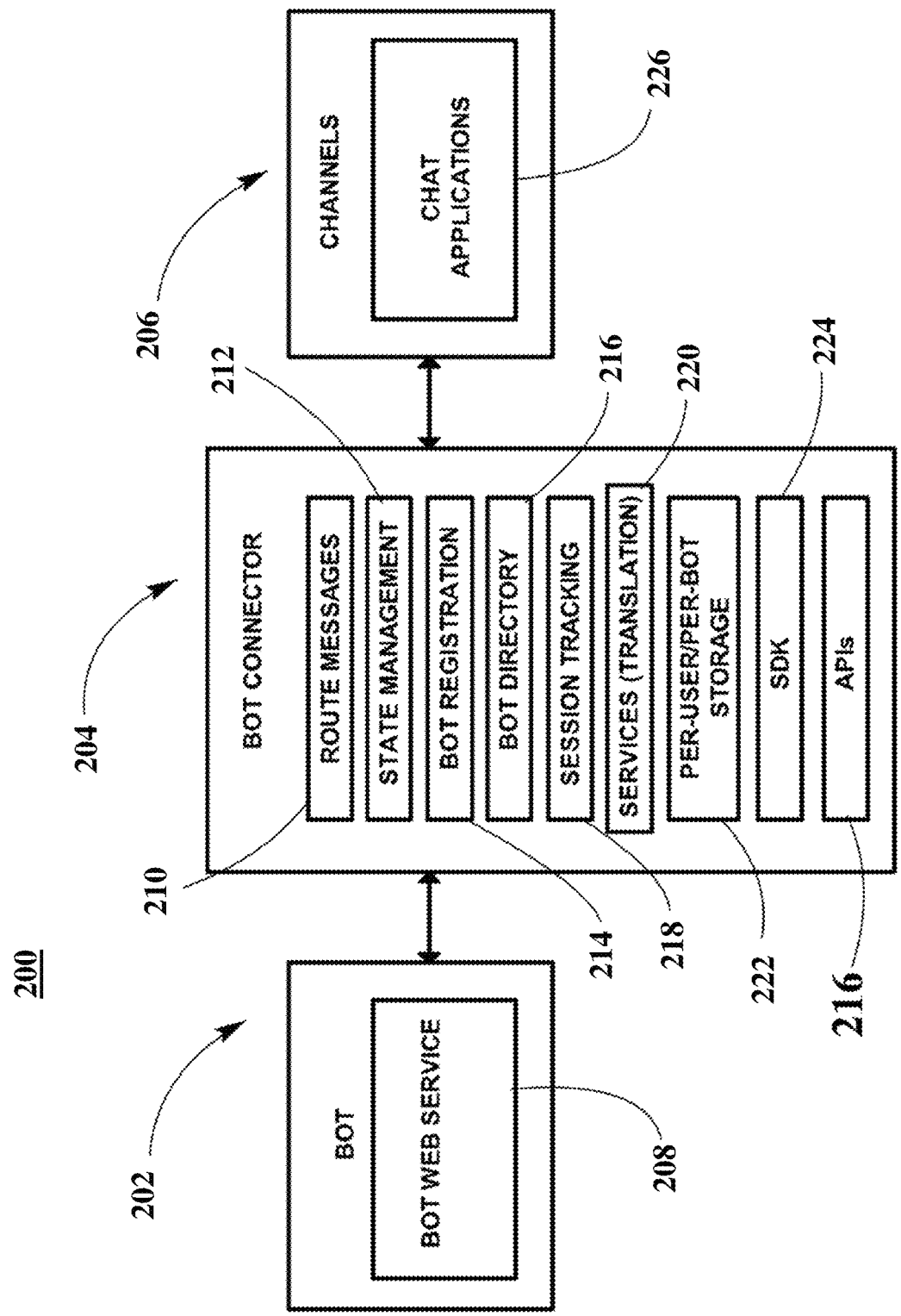
FIG. 2 illustrates a bot diagram that may be employed by LIGTS, according to an exemplary embodiment.
Figure 6:
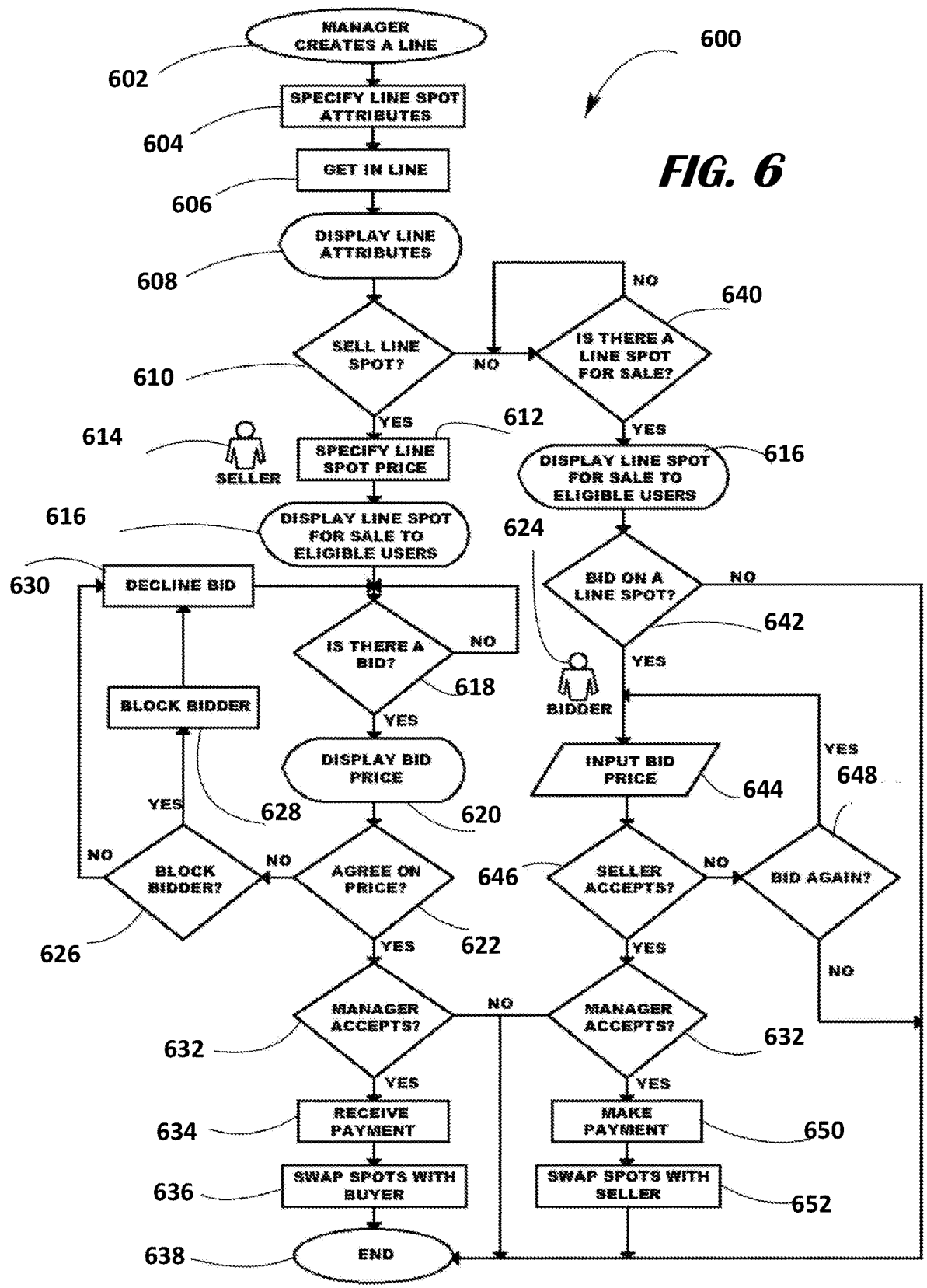
FIG. 6 illustrates a process flowchart of a restaurant line spot transaction system that may be used by users in a virtual restaurant line employing LIGTS, according to an exemplary embodiment.

FIG. 2 illustrates a bot diagram 200 that may be employed by LIGTS 100, according to an embodiment. In FIG. 6, a bot 202 is connected to channels 206 via bot connector 204.

Bot 202 may act as an automated agent that communicates and interacts with a user (such as the user 134) employing channels 206 and connecting through bot connector 204. Bot 202 simulates an intelligent conversation with a user 134, and may be designed to allow limited intangible goods transactions to take place between multiple users. Bot 202 may include a bot web service 208 for connection with LIGTS 100.

Bot connector 204 may include several functions, such as routing messages 210 from user 134 via channels 206 to bot 202 and vice-versa; performing state management 212, meaning to manage all stored data within bot connector 204 at a given instant in time; performing bot registration 214 and managing a bot directory 216, allowing developers to release different bots 202 to the public (i.e. users 134); performing session tracking 218, which is a way to track and maintain state of a user 134, more specifically recognizing a particular user 134 when said user 134 sends a request to bot 202 through channels 206; performing services 220 such as translation of text from a user 134 for clear comprehension of requests to bot 202, and translating bot 202 replies to user 134 back to original language employed by said user 134; allowing for per-user and per-bot storage 222, referring to data storage per particular user 134 related to a corresponding bot 202; enabling access to a software development kit (SDK 224), allowing for development of new bots 202 and modification of existing bots 202; and allowing access to application programming interfaces (e.g., APIs 316 described in FIG. 3) serving as interfaces for bots 202 and channels 206 to communicate with each other and for performing standard CRUD operations. Channels 206 may include suitable chat applications 226 such as Facebook Messenger™, LINE™, Skype™, Slack™, Skype™, and WhatsApp™, among others.

Figure 3:
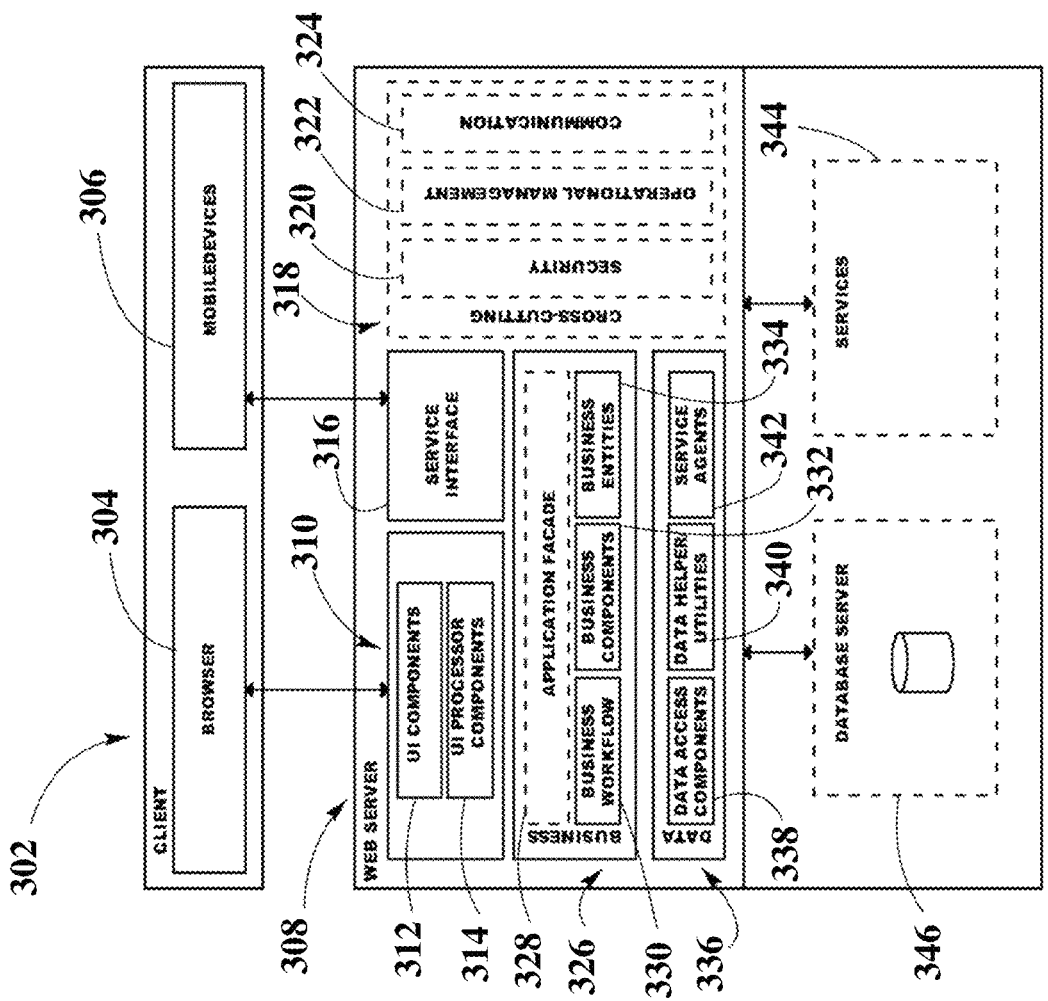
FIG. 3 illustrates an architectural diagram of a facility management application (FMA) that may be employed by LIGTS, according to an exemplary embodiment.

FIG. 3 illustrates an architectural diagram of an FMA (such as FMA 132) that may be employed by LIGTS 100, according to an embodiment. In FIG. 3, FMA 132 (described in FIG. 1) may include a client 302 (e.g. a facility employee operating a computing device of the facility) with a web browser 304 and mobile devices 306. Client 302 is connected to a web server 308 and is served presentation/UI layer 310 elements including UI components 312 and UI process components 314. Presentation/UI layer 310 may employ a caching system to load certain UI assets into memcache to reduce load times.

The web server 308 is configured to serve content to users using Hypertext Transfer Protocol (HTTP) and communicatively connects to the application servers 114 of LIGTS 100 in FIG. 1. In particular, the web servers 208 display FMA content to users through various computing elements described in FIG. 1, while the application servers 114 are in charge of executing the logic, i.e., the interaction between the user and the content displayed. The application servers 114 may be configured to deal with different protocols, including but not limited to HTTP.

The presentation/UI layer 310 is configured to enable user interaction. The UI components 312 include code to perform functions such as configuring the visual appearance of controls, accepting and validating user input, and acquiring and rendering data. The UI process components 314 perform presentation/UI layer tasks that are not directly related to user interactions. For example, UI process components 314 may enable the flow of control between forms in the presentation/UI layer 312 and coordinate background tasks such as state management and handling of concurrent user activities. Users are able to see and interact with UI components 312, whereas UI process components 314 are typically not visible to users but perform vital supportive role to UI components 312.

Mobile devices 306 and external resources, if existent, may communicate with API 316 of LIGTS 100 platform. API 316 may be used to perform standard CRUD (create, read, update, delete) operations for LIGTS 100. Web server 308 may additionally include cross cutting functions 318 such as security 320, operational management 322, and communication 324. Security 320 may protect data by using user tokens and sessions. Operational management 322 may be used to maintain factors relevant to business operation including business analytics, such as user 134 count. Communication 324 may be employed to communicate to facilities, employees, or customers.

A business function layer 326 may be used to hold business logic and rules, and may include application facade 328, business workflow 330, business components 332, and business entities 234. A data layer 336 may include data access components 338, data helpers/utilities 340, and service agents 342. Service agents 342 may be utilized to retrieve various services per user 134. Data layer 336 may additionally hold data per application and communicate with services feature 344 to sync data between database server 346. A similar architecture (not show for clarity and brevity purposes) may be used for FCA module described in FIG. 1.

Figure 4:
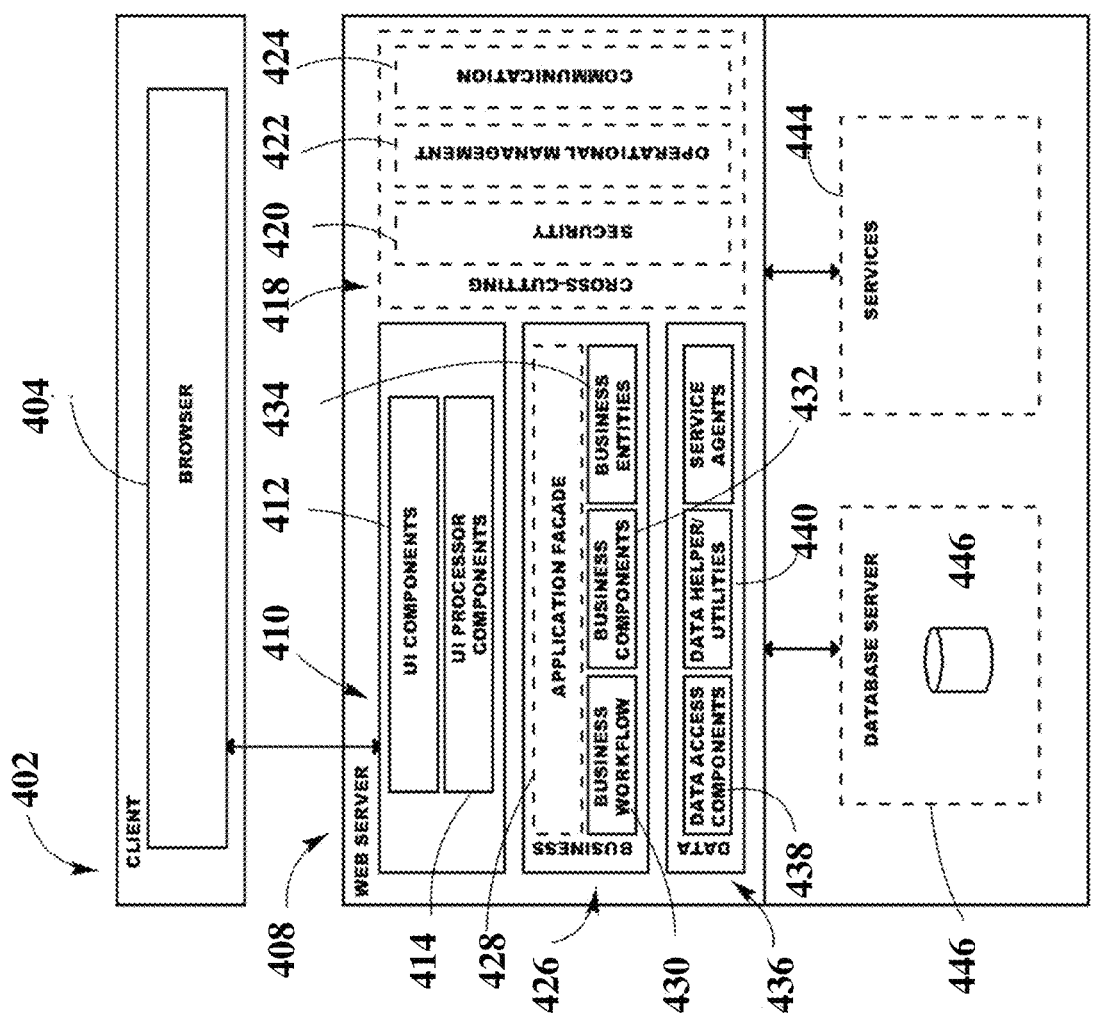
FIG. 4 illustrates an architectural diagram of a content management application (CMA) that may be employed by LIGTS, according to an exemplary embodiment.

FIG. 4 illustrates an architectural diagram of CMA 110 that may be employed by LIGTS 100, according to an embodiment. CMA 110 may manage the full life cycle of content components of LIGTS 100, from inception through removal. CMA 110 may create, maintain, and remove content components to and from a repository. In FIG. 4, CMA 110 includes a client 402 with a web browser 404. Client 402 is connected to a web server 408 and is served presentation/UI layer 410 elements including UI components 412 and UI process components 414. Presentation/UI layer 410 may employ a caching system to load certain UI assets into memcache to reduce load times.

Web server 408 may additionally include cross cutting functions 418 such as security 420, operational management 422, and communication 424. Security 420 may protect data by using user tokens and sessions. Operational management 422 may be used to maintain factors relevant to business operation including business analytics, such as user 134 count. Communication 424 may be employed to communicate to facilities, employees, or customers.

A business function layer 426 may be used to hold business logic and rules, and may include application facade 428, business workflow 430, business components 432, and business entities 434. A data layer 436 may include data access components 438, data helpers/utilities 440, and service agents 442. Service agents 442 may be utilized to retrieve various services per user 134. Data layer 436 may additionally hold data per application and communicate with services feature 444 to sync data between database server 446.

Figure 5:
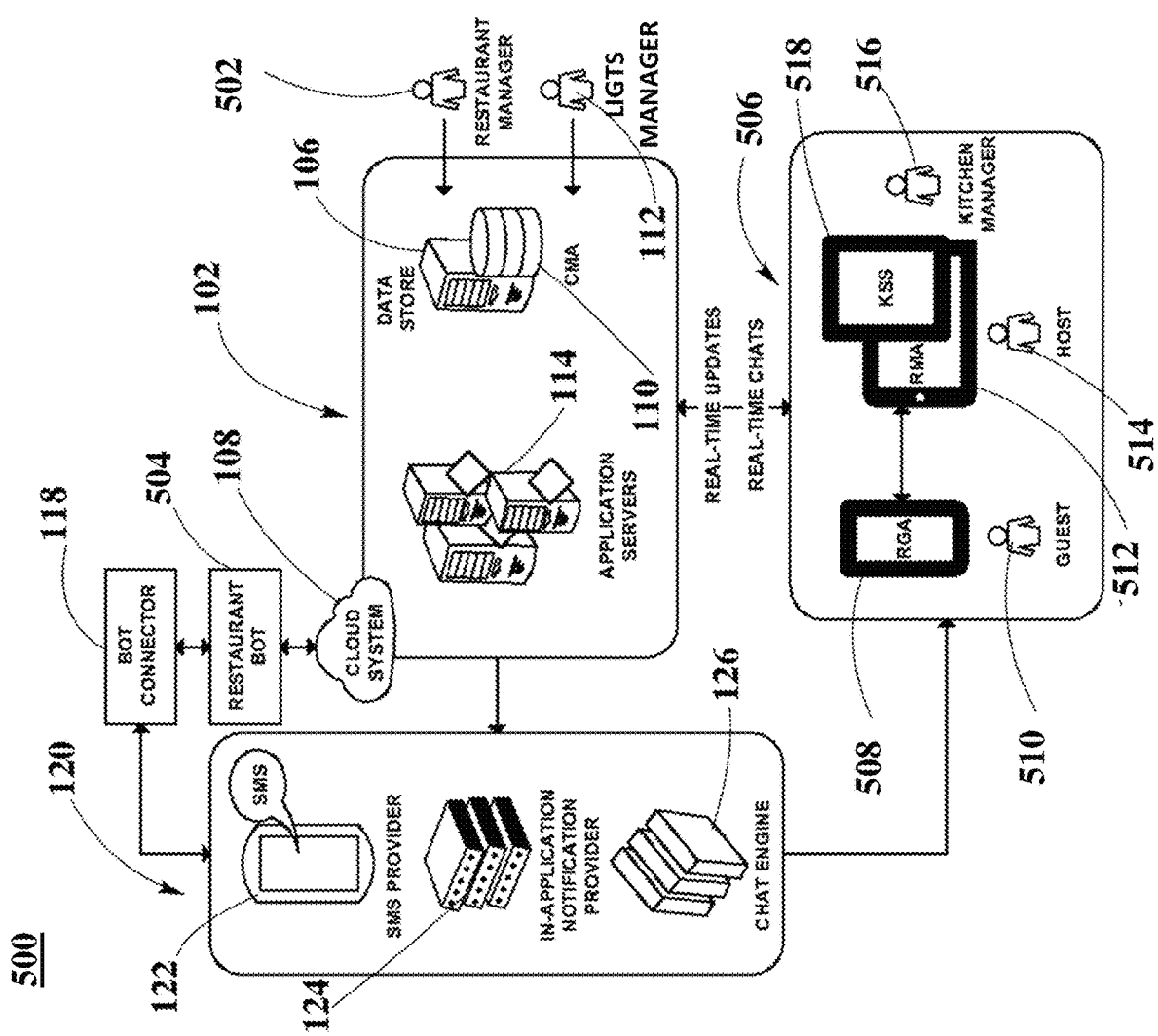
FIG. 5 illustrates an architectural diagram of LIGTS applied by a user in a virtual restaurant line to make transactions with other users in the same virtual restaurant virtual line, according to an exemplary embodiment.

FIG. 5 illustrates an architectural diagram of LIGTS 100 applied by a user 134 in a restaurant line to make line spot transactions with another user 134 in the same restaurant line, according to an embodiment. In FIG. 5, an information storage system 102 allows for a restaurant manager 502 to input and access restaurant information into an hard disk drive utilized by the data store 106, which is connected to a content management application (CMA 110). Information in CMA 110 may be readily available for sharing with LIGTS manager 112. Additionally, information from CMA 110 may also be shared with application servers 114. According to an embodiment, suitable information in information storage system 102 may include restaurant location, restaurant menu with food types and prices, and restaurant wait time, amongst others. Information included in information storage system 102 may additionally be stored in a suitable cloud system 108, such as Amazon® Web Service (AWS). In addition, information from information storage system 102 may be shared with any other module within the described LIGTS 100, which may include an in-application notification provider utilizing various methods disclosed in above. Application server 114 may also share information with a restaurant bot 504, which may include a restaurant guest application (RGA 508) connected to a restaurant management application (RMA 512). RMA 512 may in turn be also connected to a kitchen server screen (KSS 510). RGA 508 registers requests and other information from users 134.

According to an embodiment, real time updates are available between restaurant bot 504 and information storage system module 102, allowing a user 134, host 514, and restaurant manager 516 to mutually access information available from information storage system 102. For example, a request that affects a waiting line, such as a request from a user 134 to swap a spot in a line with another user may be registered by RGA 508, transferred to RMA 512 and displayed to a restaurant manager 502 via KSS 518. The request may also be shared with all elements of information storage system 102 so that the information database is kept continuously updated. RMA 512 may as well allow a restaurant manager 502 to create a restaurant line. The term "lines," as used herein, may refer to virtual restaurant lines or queues, meaning that users 134 do not stand physically in a line.

FIG. 6 illustrates a process flowchart of a restaurant line spot transaction method 600 that may be used by a user 134 in a restaurant line employing the LIGTS 100 for performing transactions with another user 134 in the same restaurant line, according to an embodiment. Users 134 may have access to restaurant line spot transaction method 600 through a LIGTS 100 UX which may be provided through a mobile application, website application, or automated agent through a chat application. Additionally, restaurant line spot transaction method 600 may be an optional feature for restaurants to use, providing them with a function to turn the feature on or off, and being displayed to customers only if the feature is turned on.

Restaurant line spot transaction method 600 may employ a LIGTS 100 architecture such as the one shown in FIG. 1 or FIG. 5.

Restaurant line spot transaction method 600 may start when a restaurant manager creates a line 602 through RMA 512. Subsequently, users 134 interested in getting in line may need to first specify line spot attributes 604, which may include party size and special requests. Special requests may include outdoor dining and bar seating, amongst others. Subsequently, a user 134 may get in line 606. Getting in line 606 provides RMA 512 with the current location of user 134. After getting in line 606, LIGTS 100 UX may display line attributes 608 including, but not limited to, current position of user 134, positions of other users within the line (e.g., queue) and other user positions that are offered for sale.

Afterwards, user 134 may be given an option to sell a line spot 610. If user 134 wants to sell the line spot, he may proceed by specifying a line spot price 612, which may be done either inputting a price for the line spot or entering a best offer tag. For simplicity, a user 134 intending to sell a line spot may hereinafter be referred to as a seller 614. Sellers 614 may be able to change price for their spot at any time. Sellers 614 may also be able to turn off their spot for sale at any time.

After adding the price for sale or best offer tag, the information that a line spot is for sale is displayed to other eligible users, which may be represented by a currency symbol (e.g., "$") next to place of seller 614. This currency symbol may only be seen by other eligible users 134. As used herein, users 134 may be eligible when having the same party size, special requests and current physical location within "n" miles of restaurant as seller 614. Eligible users may as well be able to see the sales price for the line spot put on sale. Additionally, eligible users 134 may get notifications any time new line spots are available for sale in the same line.

Subsequently, RMA 512 may check if there is a bid 618 from other eligible users 134 for the line spot put on sale by seller 614. If there is no bid, RMA 512 may continue to check if there is a bid 618 in a loop cycle. Otherwise, if there is a bid, LIGTS 100 UX displays the bid price 620 to seller 614, who may be asked whether he agrees with the bid price 622. For simplicity, a user 134 making a bid may hereinafter be referred to as a bidder 624.

If seller 614 does not agree with the price, he may be given an option to block the bidder 626. If seller 614 agrees to block the bidder 628, bidder 624 may be prevented to keep bidding to the current seller 614. Regardless of a seller 614 blocking or not blocking a bidder 624, seller 614 may continue by declining the bid 630 and RMA 512 may continue by checking if there is a bid 618 for the line spot put on sale by seller 614.

If seller 614 agrees on the price offered by bidder 624, RMA 512 may alert restaurant manager 502 that a line transaction may be about to take place, giving restaurant manager 502 an option to approve or reject the line transaction 632. If restaurant manager 502 approves the line transaction, seller 614 may select an option to receive payment 634, later swapping spots with the buyer 636 and ending the process at end 638. Otherwise, if restaurant manager 502 rejects the transaction, the process may end 638. When swapping spots with the buyer 636, RMA 512 may display to host 514 that a seller 614 and bidder 624 have just swapped spots, updating line spot positions in the restaurant line.

Going back to a user 134 being given an option to sell a line spot 610, if a user 134 does not want to sell a line spot, RMA 512 may check if there are available line spots for sale 640. RMA 512 may only look for line spots for sale for which a user 134 is eligible. In case of not finding available spots for sale, RMA 512 may continue searching for line spots in a loop cycle. Otherwise, LIGTS UX may display line spots for sale 616 to eligible user 134, which may be represented by a currency symbol next to place of seller 614. Sales price of line spot put on sale by seller 614 may also be displayed to eligible users 134. An eligible user 134 may then be given an option to bid on a line spot 642. In negative case, user 134 may proceed by ending the process at end 638. In positive case, a user 134 may become a bidder 624 and may proceed by inputting a bid price 644 for the line spot on sale.

RMA 512 may then check if a seller accepts the bid price 646. In case a seller 614 does not agree with the bid price, a bidder 624 may be given an option to bid again 648, after which bidder 624 may proceed by again inputting a bid price 544. If bidder 624 does not want to bid again, he may end the process 538. In case a seller 614 agrees with the price, RMA 512 may alert restaurant manager 502 that a line transaction may be about to take place, giving restaurant manager 502 an option to approve or reject the line transaction 532. If restaurant manager 502 does not approve the transaction, the process may end 638. Otherwise, if restaurant manager 502 approves the transaction, bidder 524 may proceed by making payment 650 and swapping spots with seller 552 to finally end the process 538. When swapping spots with seller 652, RMA 512 may display host 514 that a seller 614 and bidder 624 have just swapped spots, updating line spot positions.

According to an embodiment, option to approve or reject the line transaction 632 may be an alternative function provided by LIGTS manager 112 to restaurant manager 502. In other words, depending on restaurant manager 502 preferences, some restaurants may not need approval of restaurant manager 502 in order to perform line spot transactions.

According to an embodiment, a spot line that has been purchased cannot be resold. Additionally, when a seller 614 sells a line spot to a bidder 624, a transaction fee may be collected by LIGTS manager 112. Optionally, restaurant manager 502 may also collect a transaction fee. Transaction fee rates may be agreed upon in advance by LIGTS manager 112 and restaurant manager 502, and may function as an algorithm embedded in CMA 110. Transaction fee rates may vary according to line attributes including wait time per person, number of people in line, market demand of restaurant, price of products in restaurant, types of product in restaurant, and geographic location, amongst others. Payments from bidders 624 to sellers 614 may be performed through a suitable payment gateway integrated in LIGTS 100, such as a PayPal™ online payment system.

In one embodiment, a system has an application module, including at least one in app notification provider configured to deliver real-time communication to a facility module, said facility module configured with a facility management application and a facility customer application; an information storage system module including application servers, hard disk drive and separate content management application configured and arranged to enable to rapid transfer of communications and processing of information between the application module; wherein limited intangible goods stored on the information storage system module are able to be transacted in real-time based on input from the facility customer application and the facility management application. This system can allow an intangible good (e.g., a reservation, a position in line) to be bought or sold by someone else that would want that good and would normally have no way to interact with that user. The transaction occurs securely and the platform verifies both the buyer and seller before transaction is executed.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

FIG. 7 shows execution steps for updating positions of one or more users of a plurality of users in a queue dataset (e.g., restaurant line), according to an exemplary method 700. The exemplary method 700 shown in FIG. 7 comprises execution steps 702, 704, 706, 708, 710, 712, 714, and 716. As will be mentioned below, the application server (or the server) may carry out all or parts of the operations. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 700 of FIG. 7 is described as being executed by a single server computer in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the security server described herein.

In a first step 702, a first session may be established between a computing device of a first user of a plurality of users and a server. As used herein the words "user" may be synonymous with the word "customer" as the person, or groups of people who are receiving the services of a facility such as a restaurant/cafe. In this example, a computing device of a first user may be a personal digital assistant (PDA), although the computing devices could be other types of personal wireless computing devices such as a portable media player, a portable gaming system, phones, and/or other similar devices. Such wireless computing devices may be handheld, body-worn, head-worn, or otherwise portably carried about by the first user.

In some embodiments, a facility customer application may be executed on the computing device of the first user, and the first session may be established between the facility customer application executed on the computing device of the first user and the server. The first session may be operable on multiple channels within a communication platforms such as web-based channel, a telephone-based channel, or the like operable on the computing device of the first user. The web-based channel may include any communication applications operable on a web domain at the computing device of the first user such as but not limited to Facebook, Skype, and Yahoo etc. The telephone-based channel may include any communication applications operable on a telephone domain at the computing device of the first user such as but not limited to SMS, MMS, Whatsapp, Line, We Chat etc.

In some embodiments, a communication session may begin when a first user accesses the facility customer application on the computing device and is properly authenticated as a user by the server. Upon authentication of the user by the server, the user may select a web-based channel and/or a telephone-based channel to establish a session with the server. The web-based channel and/or the telephone-based channel applications may be installed on the computing device of the first user, and the first user may be provided with an option in the facility customer application to select at least one channel installed on the computing device to establish a session with the server. In some embodiments, a communication channel for exchanging text or voice messages may be inbuilt in the facility customer application, and the first user may select the inbuilt channel available on the facility customer application to establish a communication session with the server. In some other embodiments, the facility customer application may use existing communication channels. For example, the user may use a chat session on a social media website or initiate a chat session with the application server via texting a bot and having a communication via the bot.

Upon establishing the session between the computing device and the server, the server may generate a session record for a web-based interaction between the computing device and the server. The session record generated by the server may contain data fields related to the interaction, such as a session identifier, a timestamp, a first user identifier, and source device information identifying the computing device (e.g., IP address, MAC address) of the first user. In some embodiments, the session record generated by the server may include one or more session attributes that may include at least a device identifier uniquely identifying the computing device of the first user. The device identifier uniquely identifying the computing device of the first user may be selected from a group consisting at least one of a phone number, an IP address, and a device ID.

In some embodiments, the first user operating the computing device during the session with the server may generate a user request. The user request may include a first user attribute selected from a group consisting of a total number of people in the first user group, a name of a restaurant the first user wants to reserve, a date of booking a restaurant, a current location of the first user, a preference of a server, or the like. The user request may further include an order value associated with the user request. The order value may correspond to a time value associated with generating the user request.

In a next step 704, a facility customer application executed on the computing device may receive the user request from other applications being executed on the computing device of the first user. In some embodiments, the first user may generate the user request using the facility customer application executed on the computing device during the session. In some embodiments, the first user may generate the user request using the facility customer application executed on the computing device prior to the beginning of the session with the server. Upon the generation of the user request, the facility customer application may transmit the user request to a bot of the server. In some embodiments, upon the generation of the user request, the facility customer application may transmit the user request to a facility management application at a facility computing device of a facility. In some embodiments, upon the generation of the user request, the facility customer application at the computing device of the user may transmit the user request to the bot of the server and the facility management application.

The facility customer application at the computing device of the user may transmit the user request to the bot of the server and/or the facility management application via a communication platform. For instance, the facility customer application may initially transmit the user request to the communication platform, and then the communication platform may transmit and/or route the user request to the bot of the server via a bot connector. In some embodiments, the server may also transmit the user request to a facility computing system of a facility of a plurality of facilities computing devices. Upon the receipt of the user request by the bot of the server, the communication platform may then receive a message corresponding to the user request from the facility computing system. In some embodiments, the facility computing system may include a user interface of the facility management application on the facility computing device that may be configured to receive data associated with the facility from the facility customer application at the computing device of the user and/or bot of the server.

In a next step 706, upon receipt of the user request by the facility computing system of the facility, the facility computing system transmits an approval message of the receipt of the user request to the server and/or the bot of the server. The server, upon receipt of the approval message from the facility computing system, may transmit a notification message corresponding to the approval of the user request to the computing device of the first user. In some embodiments, the server may transmit the notification message to the computing device of the first user during the first session. In some embodiments, when the server determines that the first session with computing device of the first user is terminated, the server may request a second session with the computing device of the first user. Upon the beginning of the second session between the server and the computing device of the first user, the server may then transmit the notification message corresponding to the approval of the user request to the computing device of the first user.

In a next step 708, the server may update a plurality of data records within a data store configured to store data records containing information about the plurality of facilities and the plurality of users. For instance, the server may update a queue dataset associated with the facility to add the information of the first user. The queue dataset may be a data record representing a queue of the plurality of users at the facility. For example, the queue dataset at the facility may include three users in a queue, and then the server may update the queue dataset to include the information of the first user in the queue. In some embodiments, the queue dataset may include an identifier for each user within the queue dataset corresponding to an order value of the user. For example, the identifier may include a name of the user, a contact phone number of the user, an email address of the user, and a preference for a mode of communication with the user. In some embodiments, the server may be configured to sort the queue dataset in accordance with the order value of each user. In some embodiments, the server may be configured to sort the queue dataset in accordance with a time and a data of the receipt of the request of each user by the facility. In some embodiments, the server may be configured to sort the queue dataset based on receiving a preference value from the facility computing system. The preference value obtained by the server from the facility computing system may be associated with the attributes corresponding to each user. The server may then transmit a notification message to the computing device of the first user regarding a number/rank of the first user in the queue and an approximate time for the first user to enter the facility. For example, when there are five users in the queue, and the first user is in the 3rd in the queue, the server may transmit a message to the computing device of the first user indicating that there are total of five users in the queue, the user is third in the queue, and it will take approximately twenty minutes for the user to enter the facility based on the number of people in the queue.

In some embodiments, the server may be configured to update and re-sort the queue dataset upon receiving the approval from the facility computing system. In some embodiments, when the server does not receive approval from the facility computing system, the server may transmit a notification to the facility customer application executing on the computing device of the second user containing a message that the queue dataset modification has been denied.

In a next step 710, the server may receive a request for a queue dataset modification by the first user operating the computing device. In some embodiments, the computing device may transmit the request for modifying the queue dataset (e.g., selling the user's spot to others) to the server during a continuing session. In some embodiments, when the computing device determines that the previous session with server has been terminated, the computing device may request a new session (for example, a third session) with the server. Upon the beginning of the new session between the server and the computing device of the first user, the computing device may then transmit the request for modifying the queue dataset to the server. The request for modifying the queue dataset may include a request to modify the data record associated with the first user within the queue dataset. For example, the request for modifying the queue dataset may include a request to move forward the position of the first user in the queue or a request to switch positions of the first user with other users in a queue. In other words, the request from the first user may include a request to move to position one in the queue, and in some cases, the request from the first user may include a request to switch position with some other user (for instance, some person behind the user) in the queue or offer the user's position within the queue for sale. In some embodiments, the request for modifying the queue dataset may include a request to sell and/or auction the position of the first user in the queue to other users in the queue. Different types of user requests to modify the queue dataset are described in FIG. 6.

In a next step 712, the server upon receiving the request for modifying the queue dataset from the computing device of the first user may then transmit the request to computing devices of other users in the queue. In some embodiments, the computing device of the first user may directly transmit the request to computing devices of other users. In some embodiments, the server may transmit the request to the computing devices of other users in the queue on a channel within the communication platform. The data transmitted in the request may include an order value corresponding to the queue dataset associated with the first user and other information provided by the first user in the request. In some embodiments, the data transmitted in the request may further include a first sorting value corresponding to a ranking of the first user in the queue. In some embodiments, the data transmitted in the request may not include personal identifiable information associated with the first user.

In a next step 714, the server may receive a request from a computing device of a second user. In some embodiments, a facility customer application may be executed on the computing device of the second user, and a session (for example, a fourth session) may be established between the facility customer application executed on the computing device of the second user and the server. The session may be operable on multiple channels within a communication platforms such as web-based channel, a telephone-based channel, or the like operable on the computing device of the second user. In some embodiments, the session between the computing device of the second user and the server may be operable via a bot of the facility customer application.

The request obtained from the computing device of the second user may include an acceptance to switch its position with the position of the first user in the queue. In some embodiments, the request obtained from the computing device of the second user may further include one or more demands of the second user such as payment of money in exchange of its position with the position of the first user in the queue. Upon the server receiving the request from the computing device of the second user, the server may then transmit the demands of the second user to the computing device of the first user, and upon receiving a confirmation from the first user regarding the demands of the second user, the server may then update the data record of the queue dataset associated with the first user by modifying the data record associated with the first user to be associated with the second user. In other words, if the first user position in a queue is fifth position and the second user position in a queue is second position, then based on the update of data records by the server, an updated data record will reflect the first user position in a queue to be second position and the second user position in a queue to be fifth position. The server may then transmit updated queue dataset indicating new positions of the users to the computing devices of both the first user and the second user. In some embodiments, the request obtained from the computing device of the second user may include an offer to buy the position of the first user in the queue. The offer may include a price (money) to buy the position of the first user in the queue. Upon the server receiving the request from the computing device of the second user, the server may then transmit the price offered by the second user to the computing device of the first user, and upon receiving a confirmation from the first user regarding the price offered of the second user, the server may then update the data record of the queue dataset associated with second first user by modifying the data record associated with second first user to be associated with the first user.

In some embodiments, the server may also receive a request from a computing device of a third user. In some embodiments, a facility customer application may be executed on the computing device of the third user, and a session (for example, a fifth session) may be established between the facility customer application executed on the computing device of the third user and the server. The session may be operable on multiple channels within a communication platforms such as web-based channel, a telephone-based channel, or the like operable on the computing device of the third user. In some embodiments, the session between the computing device of the third user and the server may be operable via a bot of the facility customer application.

The request obtained from the computing device of the third user may include an acceptance to switch its position with the position of the first user in the queue. In some embodiments, the request obtained from the computing device of the third user may further include one or more demands of the third user such as payment of money in exchange of its position with the position of the first user in the queue. Upon the server receiving the request from the computing device of the third user, the server may then transmit the demands of the third user to the computing device of the first user, and upon receiving a confirmation from the first user regarding the demands of the third user, the server may then update the data record of the queue dataset associated with the first user by modifying the data record associated with the first user to be associated with the third user. In some embodiments, the server may be configured to check whether the request of the first user whose response is received by the third user is open or not, and upon determining that the first user request is closed, the server may transmit a notification to the third user that the first user is no longer open. In some embodiments, if the server receives two or more requests from other users in response to the request of the first user, the server may transmit requests from all users to the computing device of the first user.

In a next step 716, the server may transmit the updated queue dataset to the facility computing system of the facility. The server may further generate a notification regarding the modified queue dataset on the user interface associated with the facility management application executing on at least one facility computing device of the facility. The updated queue dataset may indicate details of the users in the queue to enter the facility.

Figure 8A:
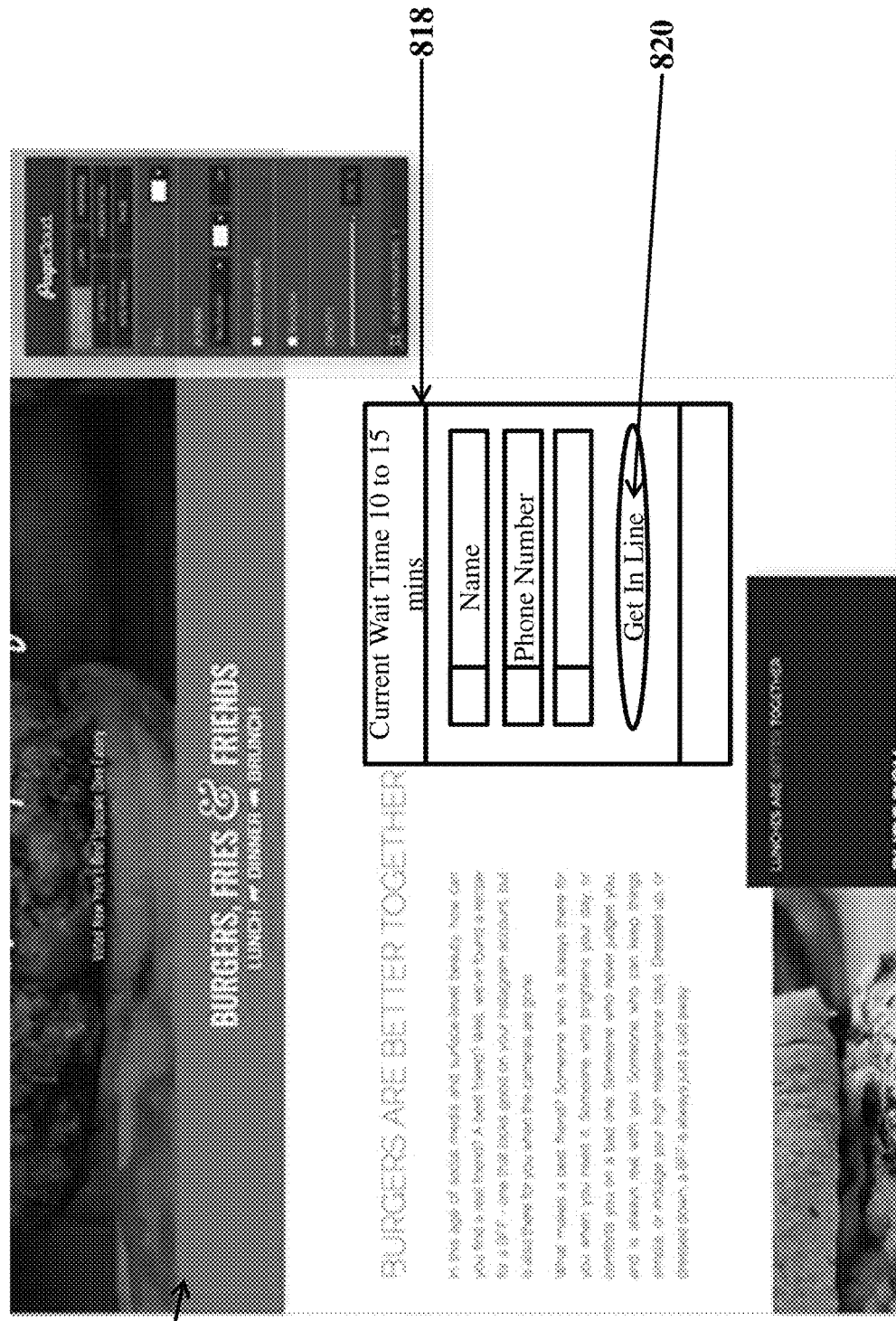
FIG. 8A illustrates a graphical user interface showing a webpage executed on a computing device of a user, according to an exemplary embodiment.

FIG. 8A shows a graphical user interface 800 showing a webpage 816 executed on a computing device of a user, according to an exemplary embodiment. In some embodiments, the computing device may be any portable or non-portable device, such as a desktop computer, a laptop computer, a tablet computer, a smart phone, a smart watch, a gaming console, a personal digital assistant, or the like. The computing device may include a processor/microcontroller and/or any other electronic component that performs one or more operations according to one or more programming instructions. The computing device may be capable of communicating with a system server through a communications network using wired or wireless communication capabilities.

A facility customer application (FCA) may be installed on the computing device of the user or may be configured to display on a website of a facility. For example, a facility manager may generate the FCA as a widget 818 configured to communicate with different users and the widget 818 may be displayed on the website of the facility. The server (e.g., the application server as depicted and described in FIG. 1) may have access to one or more databases or pre-stored web-based interfaces, such as webpages, comprising a number of preconfigured sub-interfaces, or containers, that are dynamically populated (e.g., widget box 818). For example, facility webpages may contain code, such as HTML or PHP, presenting a website of any number of webpages having a common "look-and-feel." One or more outputs or results may display webpages 816 that may contain additional code for containers, where the container code displays an FCA (e.g., widget 818). A user may access a webpage 816 and interact with the server via the FCA widget 818. In some implementations, the server may be configured to require user authentication based upon a set of user authorization credentials (e.g., username, password, biometrics, cryptographic certificate) to provide access to the FCA on the computing device. For example, the server may access a system database configured to store the user credentials, which the webserver may be configured to reference in order to determine whether a set of entered credentials purportedly authenticating the user match an appropriate set of credentials that identify and authenticate the user. Similarly, in some implementations, the webserver may generate and serve applications/webpages associated to the facility customer application to the computing device based upon a user membership account. In some embodiments, the webserver may generate and serve applications/webpages associated to the facility (such as the webpage 816) to the computing device based upon a user role. In such implementations, a user role may be defined by data fields in the user records stored in the system database, and authentication of the user and the user role may be conducted by the webserver by executing an access directory protocol.

During operation, a user may accesses the webpage 816 by any common access method, e.g., keying in a URL, selecting from search results, etc., and submit user credentials to access the facility customer application. Upon the webserver authenticating the user using credentials that identify the user as a valid member of the facility, the user is presented the FCA (via the widget box 818). The widget box 818 may be a description window that may provide information regarding a current waiting time for a lunch/dinner reservation and data fields for information to be submitted to make a reservation at the facility. For instance, the user may enter information, such as date, time, number of guests, call back number, and name, and clicks on the "Get in Line" button 820 in the widget box 818. The user may be able to make the reservation at any time of day, and therefore the restaurant/facility does not need to be open, so the user does not need to wait for an inconvenient time to telephone the restaurant.

Figure 8B:
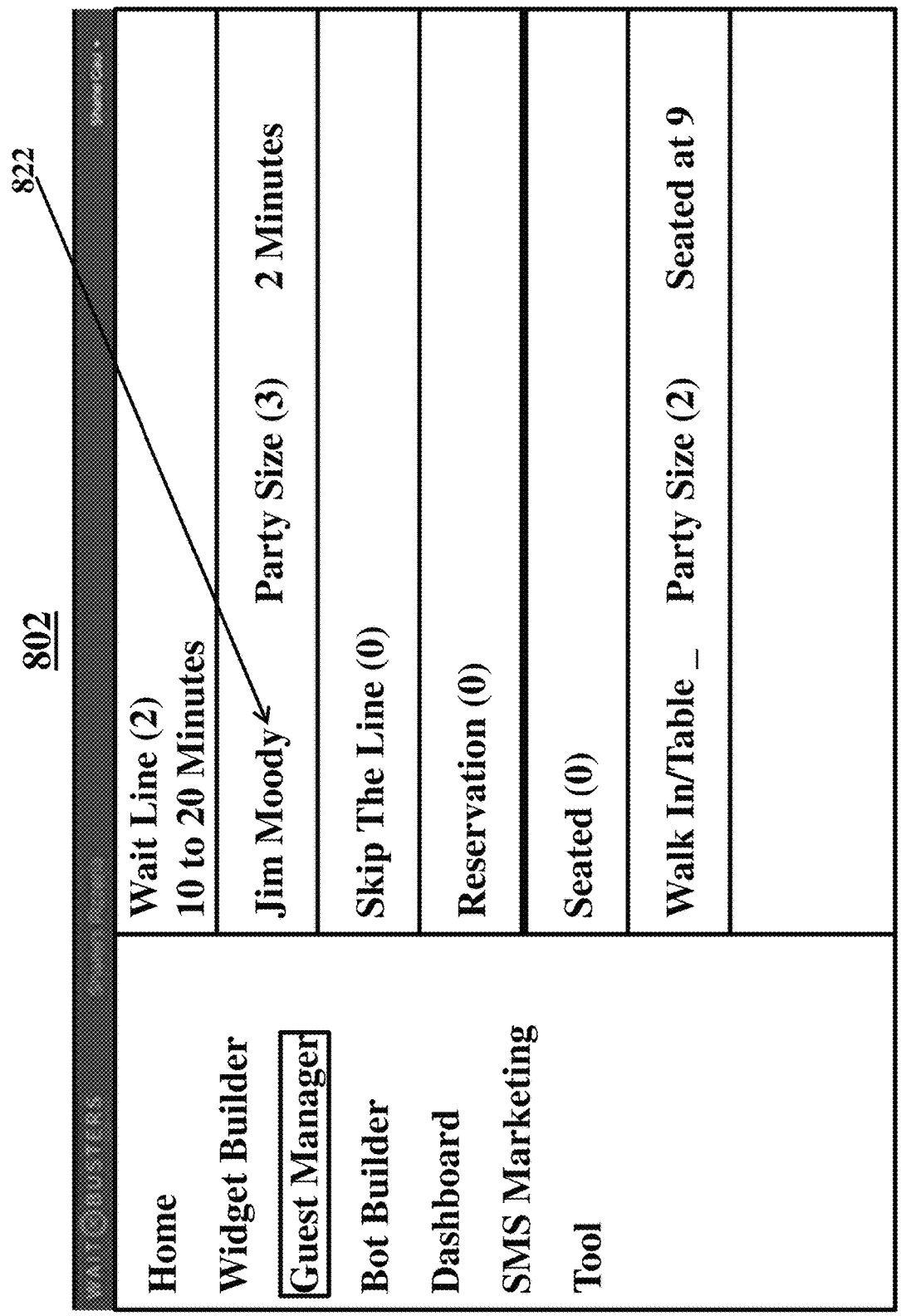
FIG. 8B illustrates a graphical user interface showing a webpage of a FMA of a facility, according to an exemplary embodiment.

FIG. 8B shows a graphical user interface 802 showing a webpage of a facility management application (FMA) of a facility, according to an exemplary embodiment. When the user clicks on the Get in Line button 820 on the FCA widget 818 at the computing device, a request of the reservation is transmitted to the restaurant and is displayed in a queue 822 on the FMA at the facility computing system of the restaurant/facility. The reservation of the user may be confirmed via a chat session using an application server prior to adding user information in the queue 822 displayed on the graphical user interface 802 of the facility computing system at the facility. The queue 822 may display names and data of others users such as status of reservation for each user (for example, seated or waiting time for each user) and party size of each user. The FMA displayed on the graphical user interface 802 may also indicate multiple options such as an option for a restaurant manager to turn on (or turn off) a skip the link option (e.g., allow or deny users the option to switch their place within the restaurant line or the queue dataset). The FMA displayed on the graphical user interface 802 may also integrate information regarding the restaurant. For example, the FMA may allow the restaurant manager to enter data regarding the restaurant, such as walk in tables, users already seated (e.g., number of patrons already seated at the restaurant). In some embodiments, the server may continuously update the queue dataset based on the information received from the FMA. For example, if the server received an indication that a user has walked in (via the FMA), the queue dataset and other pertinent information (e.g., estimated wait time for new user using the FCA to join the restaurant line) may be updated and the FMA graphical user interface 802 may reflect the changes.

Figure 8C:
FIG. 8C illustrates a graphical user interface showing a webpage of a FMA of a facility, according to an exemplary embodiment.

FIG. 8C shows a graphical user interface 804 showing a webpage of a FMA of a facility, according to an exemplary embodiment. As discussed, when the user clicks on the Get in Line button 820 on the facility customer application 816 at the computing device, a request of the reservation is transmitted to the restaurant and is displayed in a queue list 824 on a facility management application (FMA) at the facility computing system of the restaurant/facility. The queue list 824 may display names and data of others users such as phone number of each user, current status of reservation for each user (such as seated or waiting time for each user), party size of each user, and current location of each user. The queue list 824 may further display a plurality of tabs for an administrator of a facility to cancel (using cancel tab) or edit (using edit tab) the reservation for any user in the queue and then notify (using notify tab) the user regarding any change in status of the reservation of the user.

Figure 8D:
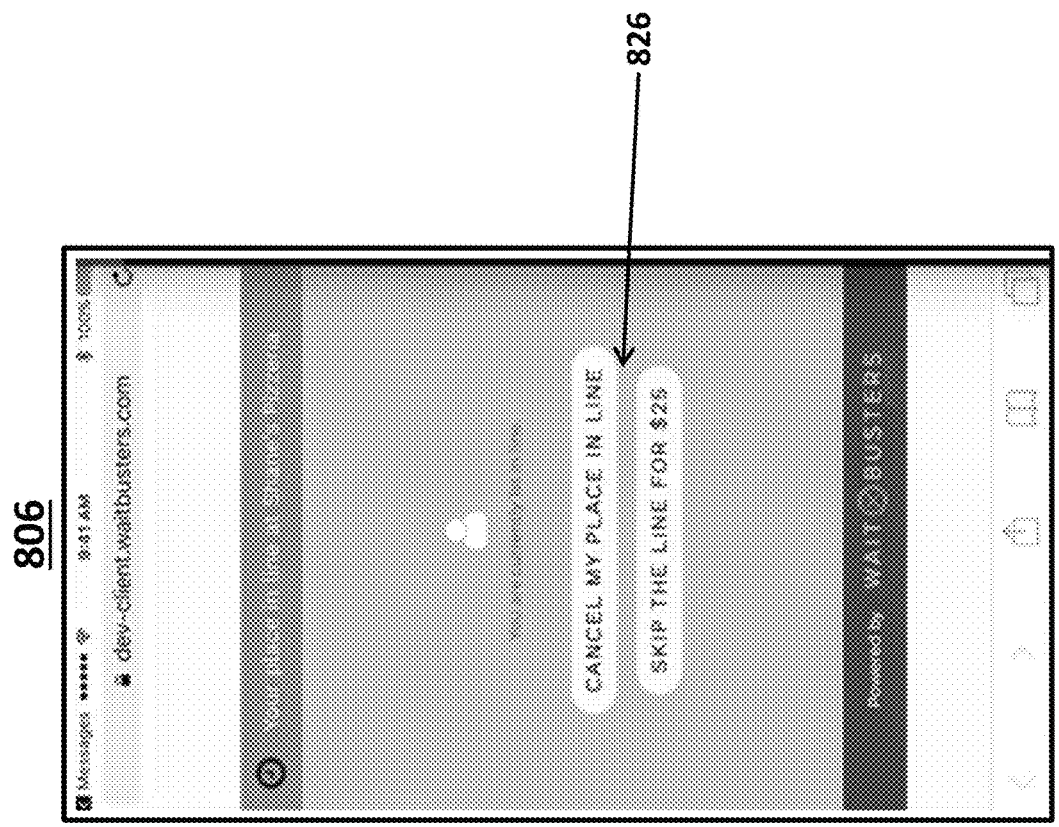
FIG. 8D illustrates a graphical user interface showing a webpage of a FCA executed on a computing device of a user, according to an exemplary embodiment.

FIG. 8D shows a graphical user interface 806 showing a webpage of a facility customer application (FCA) executed on a computing device of a user, according to an exemplary embodiment. Upon the user being added into the queue list 824, the facility management application may transmit a confirmation message to the facility customer application at the computing device of the user. Upon receipt of the confirmation message on the facility customer application at the computing device of the user, the facility customer application at the computing device of the user may display a plurality of tabs 826 indicating a tab for a ranking number in the queue for a user, a tab to cancel the place in queue for a user, and a tab to request to skip the line in the queue for a pre-determined amount. The user of the computing device may select a tab to cancel the place in queue to cancel the reservation at the facility or a tab to request to skip the line in the queue for a pre-determined amount to initiate a request for moving forward in the queue in return of the pre-determined amount.

Figure 8E:
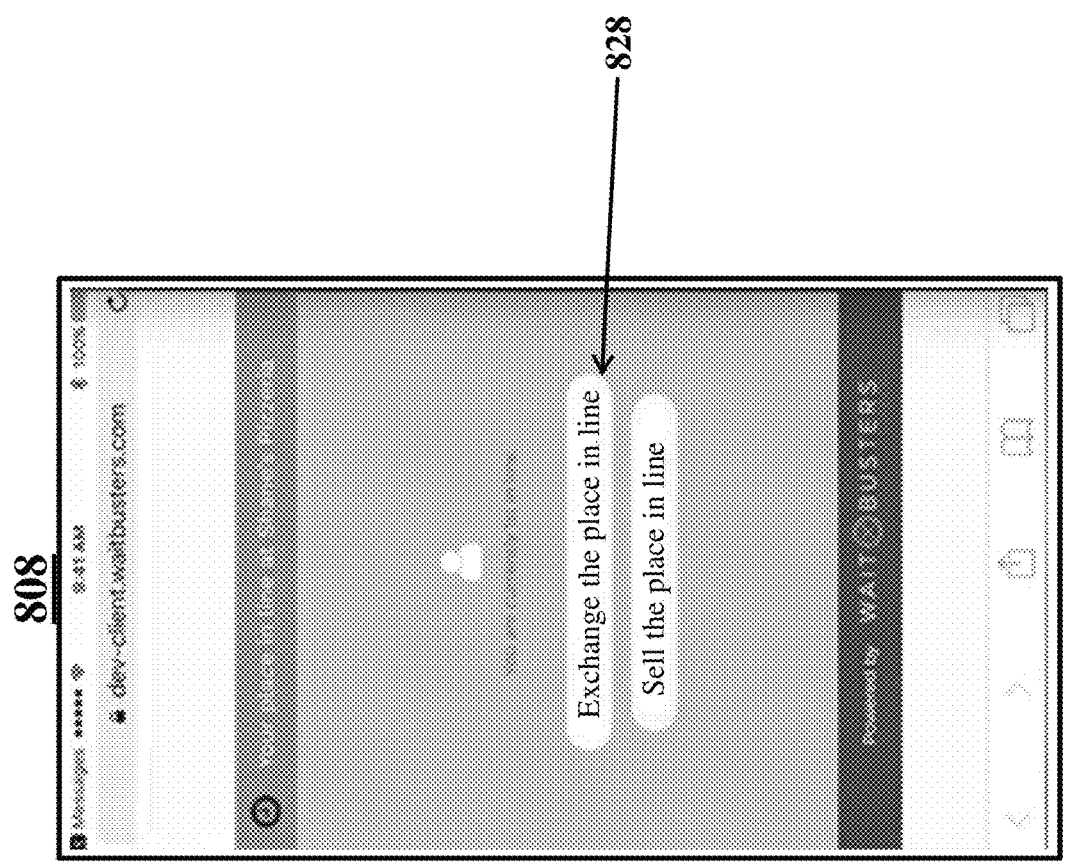
FIG. 8E illustrates a graphical user interface showing a webpage of a FCA executed on a computing device of a user, according to an exemplary embodiment.

FIG. 8E shows a graphical user interface 808 showing a webpage of a facility customer application (FCA) executed on a computing device of a user, according to an exemplary embodiment. As discussed, upon the user being added into the queue list 824, the facility management application may transmit a confirmation message to the facility customer application at the computing device of the user. Upon receipt of the confirmation message on the facility customer application at the computing device of the user, the facility customer application at the computing device of the user may display a plurality of tabs 828 indicating a tab to exchange the place in queue and a tab to sell the place in the queue. The user of the computing device may select a tab to exchange the place in queue with other users based on one or more mutual agreements or select a tab to sell the place in the queue to other users for a pre-determined amount and then initiate communication with other users in the queue to make an auction for the position in the queue.

Figure 8F:
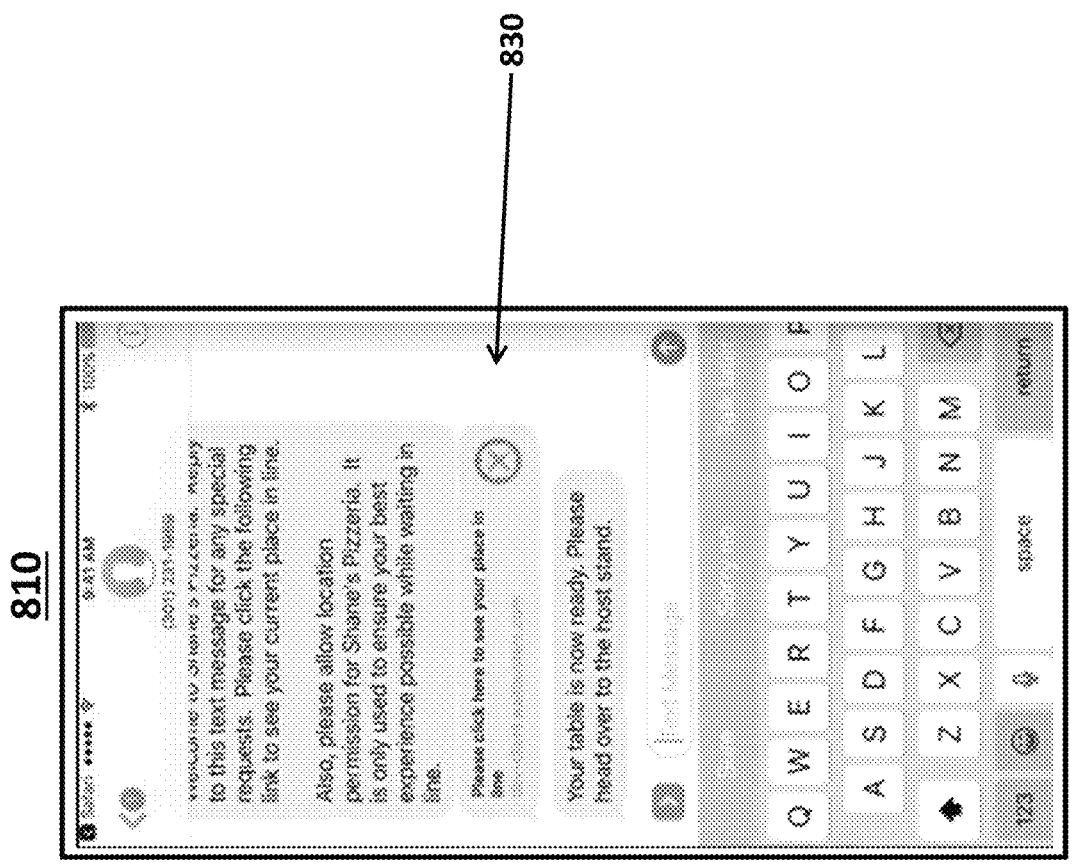
FIG. 8F illustrates a graphical user interface showing a chat session on a user interface on a computing device of a user, according to an exemplary embodiment.

FIG. 8F shows a graphical user interface 810 showing a chat session on a user interface on a computing device of a user, according to an exemplary embodiment. Upon the user reservation being ready at the facility/restaurant according to the queue list 824 at the facility/restaurant, a facility management application at the facility/restaurant may transmit a notification message 830 regarding reservation being ready at the facility/restaurant to a facility customer application at the computing device of the user and/or at any contact information such as email/phone number of the computing device of the user provided by the user.

Figure 8G:
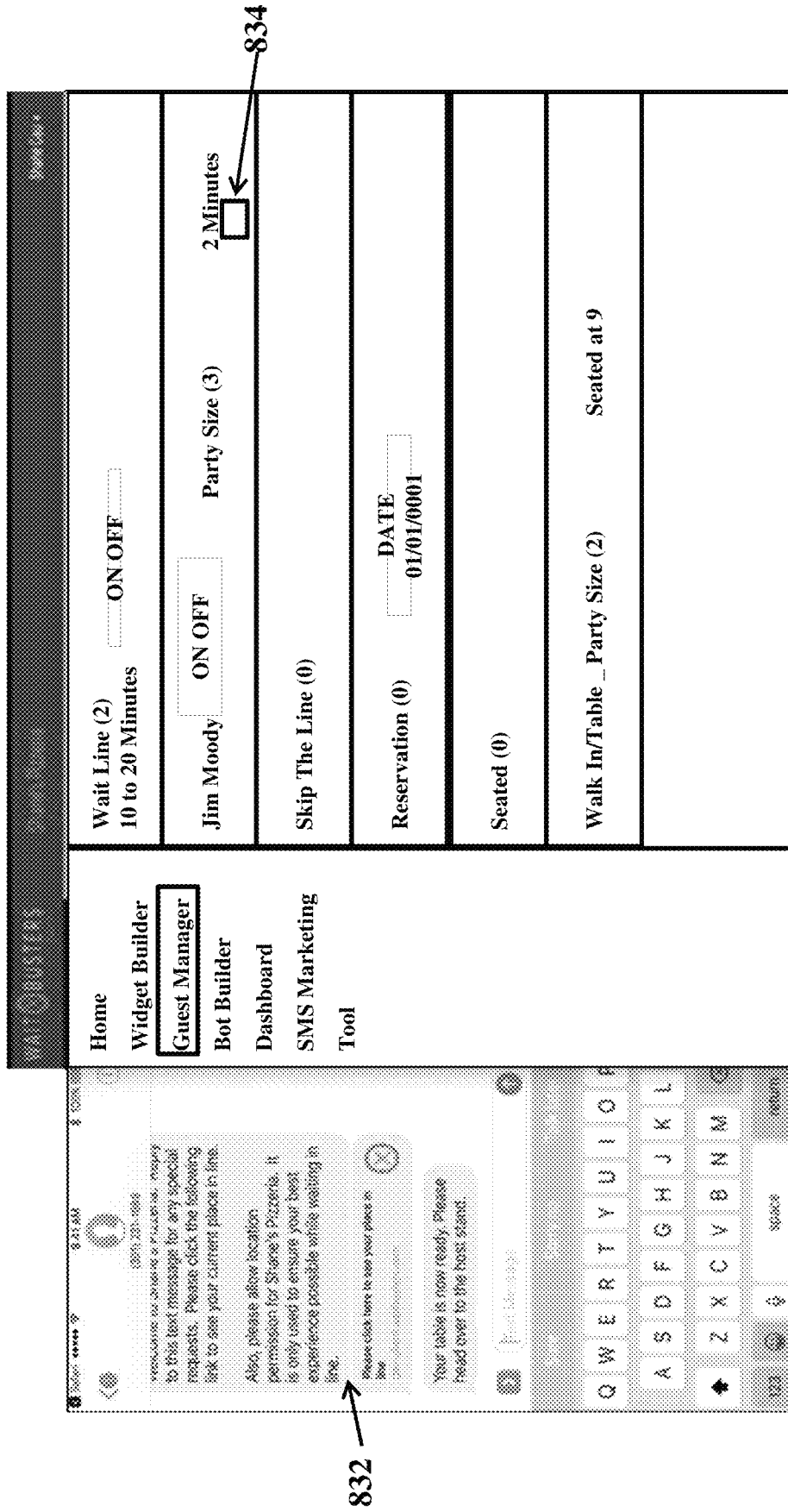
FIG. 8G illustrates a graphical user interface showing a webpage of a facility computing system of a facility (e.g., real time updating for the FMA in accordance with the user's answer), according to an exemplary embodiment.

FIG. 8G shows a graphical user interface 812 showing a real time update of a queue line, according to an exemplary embodiment. As discussed, upon the user reservation being ready at the facility/restaurant according to the queue list 824 at the facility/restaurant, a facility management application on the facility computing system at the facility/restaurant may transmit a text notification message 832 regarding reservation being ready at the facility/restaurant at any contact information such as phone number provided by the user. At the same time, the facility management application on the facility computing system at the facility/restaurant may change a status 834 for the user in the queue displayed on a user interface of the facility computing system from a prior status indicting approximate waiting time to a status indicating seated at the facility.

FIG. 8H shows a graphical user interface 814 showing a webpage on a facility computing system at a facility, according to an exemplary embodiment. The webpage of the facility management application on the facility computing system at a facility may include a chat icon 838 that allows an administrator of the facility to communicate directly (using the bot connector and the bot depicted and described in FIG. 1) with one or more users in the queue. In some embodiments, an administrator of the facility may be able to communicate with the one or more users in the queue using the chat icon 838 on the facility management application installed on the facility computing system at a facility and a corresponding chat icon provided on the facility customer application available at the computing devices of the one or more users.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What we claim is:

1. A computer-implemented method comprising:
    receiving, by a server, via a facility customer application executing on a computing device of a first user from a plurality of users during a first session on a channel within a communication platform, a user request from the first user,
        wherein the facility customer application is configured to receive user requests from the user computing device and transmit the user request to at least one of a bot of the server and a facility management application,
        wherein the user request comprises at least a first user attribute and an order value associated with the user request, and
        wherein the communication platform is configured to:
            receive, from the facility customer application, the user requests and route the user request to the bot of the server via a bot connector, and
            receive, from a facility computing system, a message corresponding to the user request, the facility computing system comprising a user interface of the facility management application on a facility of a plurality of facilities computing device,
                wherein the user interface is configured to receive data associated with the facility; and
    transmitting, by the server, the user request to the facility computing system of the facility;
    upon transmitting the user request, receiving, by the server, an approval from the facility computing system of the facility;
    transmitting, by the server, to the computing device of the first user, during a second session on the channel within the communication platform, the message corresponding to the user request comprising a notification that the user request has been approved;
    updating, by the server, a plurality of data records within a data store configured to store data records containing information about a plurality of facilities, the plurality of users, and a queue dataset associated with each facility comprising at least one user,
        wherein the queue dataset is a data record representing a queue of the plurality of users at a facility of the plurality of facilities,
        wherein the queue dataset comprises an identifier for each user within the queue dataset corresponding an order value of the user,
        wherein the queue dataset is sorted, by the server, in accordance with the order value of each user;
        wherein the server updates and re-sorts the queue dataset upon receiving the approval from the facility computing system;
    receiving, by the server, from the first user, during a third session on the channel within the communication platform, a request for a queue dataset modification,
        wherein the request comprises a request to modify the data record associated with the first user within the queue dataset;
    upon receiving the request for modification, transmitting, by the server, to the plurality of users, on the channel within the communication platform, a facility identifier, the order value corresponding to the queue dataset associated with the first user, and a first sorting value corresponding to a ranking of the first user in the queue of plurality of users having the first user attribute;
    upon receiving a second user request from a second user, via the bot of the facility customer application executing on a computing device of the second user and during a fourth session on the channel within the communication platform, updating, by the server, the data record of the queue dataset associated with the first user by modifying the data record associated with the first user to be associated with the second user;
    transmitting, by the server, the updated queue dataset to the facility computing system, whereby the server causes the user interface associated with the facility management application executing on at least one facility computing device to display a notification comprising identification of the second user and the modified queue dataset; and
    transmitting, by the server, via the bot of the facility customer application executing on the computing device of the second user and during the fourth session on the channel within the communication platform, a notification to the second user, wherein the notification contains the modified queue dataset.

2. The method of claim 1, wherein the order value corresponds to a time value associated with receiving the user request.

3. The method of claim 1, wherein the queue dataset is sorted, by the server, in accordance with a time value associated with the receipt of a request of each user.

4. The method of claim 1, wherein the queue dataset is sorted, by the server, based on receiving a preference value from the facility computing system.

5. The method of claim 1, wherein the computing device of a first user is a mobile device.

6. The method of claim 4, wherein the preference value is associated with each user's attributes.

7. The method of claim 1, further comprising:
in an event of not receiving approval form the facility computing system:
transmitting, by the server, a notification to the facility customer application executing on the computing device of the second user containing a message that the queue dataset modification has been denied.

8. The method of claim 1, wherein the transmittal of the queue dataset to the plurality of users does not include any personal identifiable information associated with the plurality of users.

9. The method of claim 1, wherein the server only modifies the data record associated with the first user within the queue dataset one time.

10. The method of claim 1, wherein the channel within the communication platform is a chat session on a social media website.

11. A computer system comprising:
a server configured to:
receive via a facility customer application executing on a computing device of a first user from a plurality of users during a first session on a channel within a communication platform, a user request from the first user,
wherein the facility customer application is configured to receive user requests from the user computing device and transmit the user request to at least one of a bot of the server and a facility management application,
wherein the user request comprises at least a first user attribute and an order value associated with the user request, and
wherein the communication platform is configured to:
receive, from the facility customer application, the user requests and route the user request to the bot of the server via a bot connector, and
receive, from a facility computing system, a message corresponding to the user request, the facility computing system comprising a user interface of the facility management application on a facility of a plurality of facilities computing device,
wherein the user interface is configured to receive data associated with the facility; and
transmit the user request to the facility computing system of the facility;
upon transmitting the user request, receive an approval from the facility computing system of the facility;
transmit to the computing device of the first user, during a second session on the channel within the communication platform, the message corresponding to the user request comprising a notification that the user request has been approved;
update a plurality of data records within a data store configured to store data records containing information about a plurality of facilities, the plurality of users, and a queue dataset associated with each facility comprising at least one user,
wherein the queue dataset is a data record representing a queue of the plurality of users at a facility of the plurality of facilities,
wherein the queue dataset comprises an identifier for each user within the queue dataset corresponding an order value of the user,
wherein the queue dataset is sorted, by the server, in accordance with the order value of each user;
wherein the server updates and re-sorts the queue dataset upon receiving the approval from the facility computing system;
receive from the first user, during a third session on the channel within the communication platform, a request for a queue dataset modification,
wherein the request comprises a request to modify the data record associated with the first user within the queue dataset;
upon receiving the request for modification, transmit to the plurality of users, on the channel within the communication platform, a facility identifier, the order value corresponding to the queue dataset associated with the first user, and a first sorting value corresponding to a ranking of the first user in the queue of plurality of users having the first user attribute;
upon receiving a second user request from a second user, via the bot of the facility customer application executing on a computing device of the second user and during a fourth session on the channel within the communication platform, update the data record of the queue dataset associated with the first user by modifying the data record associated with the first user to be associated with the second user;
transmit the updated queue dataset to the facility computing system, whereby the server causes the user interface associated with the facility management application executing on at least one facility computing device to display a notification comprising identification of the second user and the modified queue dataset; and
transmit via the bot of the facility customer application executing on the computing device of the second user and during the fourth session on the channel within the communication platform, a notification to the second user, wherein the notification contains the modified queue dataset.

12. The system of claim 11, wherein the order value corresponds to a time value associated with receiving the user request.

13. The system of claim 11, wherein the queue dataset is sorted, by the server, in accordance with a time value associated with the receipt of a request of each user.

14. The system of claim 11, wherein the queue dataset is sorted, by the server, based on receiving a preference value from the facility computing system.

15. The system of claim 11, wherein the computing device of a first user is a mobile device.

16. The system of claim 14, wherein the preference value is associated with each user's attributes.

17. The system of claim 11, wherein the server is further configured to:
in an event of not receiving approval form the facility computing system:
transmit a notification to the facility customer application executing on the computing device of the second user containing a message that the queue dataset modification has been denied.

18. The system of claim 11, wherein the transmittal of the queue dataset to the plurality of users does not include any personal identifiable information associated with the plurality of users.

19. The system of claim 11, wherein the server only modifies the data record associated with the first user within the queue dataset one time.

20. The system of claim 11, wherein the channel within the communication platform is a chat session on a social media website.

\* \* \* \* \*